(12) United States Patent
Warner et al.

(10) Patent No.: US 10,521,747 B2
(45) Date of Patent: Dec. 31, 2019

(54) SYSTEM AND METHOD FOR PROVIDING A SCALABLE SEMANTIC MECHANISM FOR POLICY-DRIVEN ASSESSMENT AND EFFECTIVE ACTION TAKING ON DYNAMICALLY CHANGING DATA

(71) Applicant: Northrop Grumman Systems Corporation, Falls Church, VA (US)

(72) Inventors: Steven Alan Warner, Centreville, VA (US); Stephen Richard Kruba, Chantilly, VA (US); Sohel Mohammad, Annandale, VA (US); Alexander Francis Karman, Annandale, VA (US); Jason Christian Kobes, Belmond, IA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 1275 days.

(21) Appl. No.: 14/681,540

(22) Filed: Apr. 8, 2015

(65) Prior Publication Data

US 2015/0286969 A1    Oct. 8, 2015

Related U.S. Application Data

(60) Provisional application No. 61/976,736, filed on Apr. 8, 2014.

(51) Int. Cl.
*G06Q 10/06*    (2012.01)
(52) U.S. Cl.
CPC ............... *G06Q 10/0633* (2013.01)

(58) Field of Classification Search
CPC .................. G06Q 10/0633; G06Q 10/0635
See application file for complete search history.

(56) References Cited

U.S. PATENT DOCUMENTS

| | | | |
|---|---|---|---|
| 9,111,088 B2* | 8/2015 | Ghai | G06F 21/55 |
| 9,563,771 B2* | 2/2017 | Lang | G06F 21/57 |
| 9,946,987 B2* | 4/2018 | Rai | G06Q 10/06 |
| 10,057,285 B2* | 8/2018 | Choudhary | G06F 21/552 |
| 2004/0054690 A1* | 3/2004 | Hillerbrand | G06Q 10/06 |

(Continued)

*Primary Examiner* — Tiphany B Dickerson
(74) *Attorney, Agent, or Firm* — Katten Muchin Rosenman LLP

(57) ABSTRACT

A system for providing a scalable semantic mechanism for policy-driven assessment and action taking on dynamically changing data includes a policy context that is a collection of ontologies that capture policies of the enterprise in a semantic, declarative grammar, in a semantic database, a performance context that receives and stores sensor data output monitoring managed assets persisted in a time-series database, a workflow context that determines the workflow process necessary to manage the managed asset based on the governance policies and sensor data, implemented using a workflow engine that supports a declarative workflow language, a decision context that contains business rules encoded in a declarative grammar, implemented using a business rule engine and in which the business rules define conditions under which an asset is corrected, and an adjudication context that defines all associations between the four contexts that are necessary to monitor and manage the enterprise managed assets.

19 Claims, 11 Drawing Sheets

(56) References Cited

U.S. PATENT DOCUMENTS

| | | | |
|---|---|---|---|
| 2008/0320552 A1* | 12/2008 | Kumar | G06F 21/552 726/1 |
| 2010/0033485 A1* | 2/2010 | Kothari | G06K 9/6253 345/440 |
| 2011/0289588 A1* | 11/2011 | Sahai | G06Q 90/00 726/25 |
| 2012/0216243 A1* | 8/2012 | Gill | G06F 21/55 726/1 |
| 2016/0048758 A1* | 2/2016 | Campbell | G06F 17/2775 706/46 |
| 2017/0220964 A1* | 8/2017 | Datta Ray | G06Q 10/0635 |

* cited by examiner

SYSTEM AND METHOD FOR PROVIDING A SCALABLE SEMANTIC MECHANISM FOR POLICY-DRIVEN ASSESSMENT AND EFFECTIVE ACTION TAKING ON DYNAMICALLY CHANGING DATA

BACKGROUND

Organizations today face numerous problems in dealing with large amounts of dynamically changing data. Among the common problems facing organizations today in this area are:
 too much information for a mission risk perspective;
 inherent insecurity of the Internet; and
 impediments to the rapid adoption of the cloud.

Too much information for a mission risk perspective creates a profound problem for modern organizations' complex information technology (IT) environments. Leaders are faced with so many tools, resources, dashboards, audit reports, bells, alarms and alerts that it is nearly impossible to distinguish which ones are important and which ones are unimportant to their specific mission goals. The call to continuously monitor and measure everything has resulted in massive quantities of data without context to the mission, with a difficulty in identifying where focus should be placed.

The fundamental difficulties of too much similar information, about too many items in multiple hierarchies, that changes too quickly for humans to understand what to do, create profound strategic, tactical, and operation problems for organizations. These problems are especially pronounced as organizations move to continuous monitoring of many systems for many data elements. Continuous monitoring systems in combination with many other commercial-off-the-shelf ("COTS") tools like security, management and other reporting tools, all displaying executive dashboards, can create information overload. The decision makers of an organization have a need to know when their mission is impacted but are currently being overloaded with too much information, across too many layers, with unnecessary levels of granularity. This results in multiple management inefficiencies that in themselves can negatively impact the mission risk to the organization.

Examples of these management inefficiencies are:
 Too many "red" alerts to respond correctly;
 No way to understand the difference in mission risk between different tool dashboards;
 Too many different tools to actually learn and use all of them correctly and wisely; and,
 Each tool is designed to be used at different layers of the organization therefore giving decision leadership a confusing multi-layer array of problems to address, spread across many interfaces.

The executive dashboards of all these tools coupled with the executive dashboards developed internally by the organization create the perfect scenario to embroil decision leaders in low level IT hardships that are not in themselves mission critical issues. This wastes an organization's time and money.

Organizations have long struggled with the ability to balance strategic planning with tactical action. Recently there has been a move toward decisions and automation of the decisions based on the massive amounts of data. Jumping ahead of an issue is often a very attractive and proactive response when faced with an alert or unknown trouble. There is a natural tendency for organizations to want to fix problems as quickly as possible, leading to a dependence on quick tactical solutions. The problem is that, for example, without a good understanding of how alert information is applicable to the organization's mission, decision services will be forced to take action without really understanding the mission impact of their actions. Action based on alerts that are not associated with strategic mission objects and concepts to give them weight and priority will result in a paralyzing grip on the resources of an organization.

Tactical actions need to be directed by organizational strategic objectives or the tactical objectives can quickly become inefficient. Tactical objectives based on alerts alone have the capacity to become even more destructive to an organization since there is an added sense of urgency associated with the event and solution. Siloed or stovepipe solutions, duplicated efforts, unneeded purchases of vender products designed to offset threats that are already mitigated by other methods or worse not critical to the organization's mission are some examples of how jumping to tactical action negatively effects the organization. In many ways tactics that are not part of a greater strategic plan could be a greater threat to the mission of an organization then the threat the tactics aim to mitigate by robbing the organization of the precious resources of people, time and money. Tactics without mission strategy may be one of the largest threats to mission assurance an organization faces.

One of the emerging issues in the continuous monitoring field is how to take action using the massive amounts of data being collected by the machines designed to collect. Machines, however face faet the same dilemma that organizational leaders face; what should I do first and why? This situation leads to priority of action based on severity of the alert and asset along and drives many policy, purchase and programmatic initiatives to solve these problems based only on an alert from the data. The problem is there are more problems than resources and ranking of problems are often not associated with the mission goals of the organization. For example, a given alert can be a critical issue for mission assurance in organization A but of no importance to the mission assurance of organization B, while the vulnerability and critical flaw is equal in importance in both organizations, and would be ranked very high by both organizations' continuous monitoring systems, driving organization B to waste effort in unnecessarily resolving the alert.

Organizational mission strategy is fundamental to aligning the tactics for solving problems. One of the greatest threats to the mission of an organization is security tactics designed to mitigate a threat but impact the ability of the organization to operate efficiently. These tactical or worse, operational reactions can become great hardships for the organization requiring many layers of bureaucratic approvals with business justifications to overcome. This is further amplified if systems are used to simply mitigate security vulnerabilities automatically that in some cases could create a business block or hurdle without warning.

The inherent insecurity of the internet is the result of the openness and interconnectivity of the internet. The troubling issue with any networked environment is that other people are on it. The opportunity and the threat live in the same dimension, mitigate one and lose the other. For this reason, organizations are faced with a difficult dilemma when implementing new technology ideas and concepts such as cloud computing. This openness provides both an opportunity and threat for organizations trying to secure their environment. This openness can lead to troubling situations, including the inability or great difficulty to reliably determine the source or attribution of cyber-attacks given the mass of data that may reflect hostile surveillance and action. By its very openness, it becomes difficult to identify who is sharing communications paths with an organization's data.

Many organizations are starting to focus on offensive cyber opportunities as a way of defending the organizations assets. While the merits of this approach are not in question, technology and techniques used for attributing exactly who is the offending party is in question. The more advanced the threat the more likely it will be with current technology that an organization does not fully understand what is happening. Ironically this plays out as an inverse relationship where an organization is most likely to attribute an attack to the wrong party where the attack poses the most risk to mission, while being most likely to attribute the correct party to an attack with the least risk to the mission. Much of an organization's inability to understand what is happening is due to an inability to connect the dots within its own assets, and lack of workflows around a solid architecturally layered audit and monitoring plan. Primary this is due to the lack of a tool that combines business logic with technical and human workflows to achieve mission tolerable objectives across the enterprise.

Most compliance toolsets and checklists focus on one aspect and only one aspect of security—"compliance." While compliance is important, seldom is an organization operating with the core mission of only being compliant with standards and laws and nothing else. Further, these tools and lists do not address the multi-layer complexity most organizations possess in terms of assets, configuration, regulatory dictates, international laws and differences in laws, etc. It can be argued that by achieving compliance an organization achieves the rest of the security needed. This could be true some of the time. However, most control lists are designed with a one or a few sizes fits all philosophy, and fail to realize enterprise security reaches far beyond the computer system into the people and operations of the business.

Finally, the rapid adoption of the cloud by organizations has resulted in the rebirth of many security issues that were once contained by organizational domain protections. The rapid adoption of cloud computing has complicated the existing enterprise issues with yet one more layer of complexity. Many of the leaders and IT administration of organizations have never faced these issues since their predecessors were the ones who established the prior existing environment with its protections. As a result, such organizations, by adopting the cloud, may be extending their mission into dangerous territory without understanding the full impact.

Cloud computing adoption has also highlighted the challenges with implementing, deploying and using public, private, and hybrid cloud environments. The primary challenges include security, interoperability, and portability, while secondary challenges include optimization of resource utilization and integration of cloud systems management with business processes. Cloud computing adoption is further hindered by the inherent complexity of effectively measuring, monitoring, and evaluating the security of an environment and then turning that analysis and security policy into secure administrative actions and time bound actionable security improvements ranked by the organizations risk tolerance. This problem is further exacerbated with public clouds, and the inherent insecurity of the internet coupled with the lack of visibility into a public cloud service provider's environment.

What is required is an approach that uses the output of existing security monitoring and systems management tools to make decisions based on the customer's risk tolerance, security policies, and business processes. Many times these decisions are executed across multiple disparate third party tools designed to interact and control the existing environment. This creates a "multiple panes of glass" problem, and may result in gaps or overlaps within a toolset that further conceal the true state of the environment. The objective approach must provide a rationale means for orchestration of these disparate tools, creating a single view of the environment across them, to include harvesting and managing the rich metadata associated with security objects within the environment. Where these tools themselves provide orchestration and automation of security and systems management activities, they must be choreographed (orchestration of multiple centers of orchestration) to result in harmonious and consistent operations. This orchestration and integration must also include a mechanism for defining security attributes and policies, and then function as a policy decision point as appropriate, with policy enforcement driven back into the individual tools thru appropriate interfaces. The concept of distributed transactions must also be respected where synchronization of action across multiple endpoints is required (for example, all must complete otherwise none complete).

Consequently, organizations need new mechanisms for effectively and efficiently monitoring, harvesting and assessing large amounts of dynamically changing data and then automating actions, such as security decisions, based on this effective assessment. Current monitoring technologies work against relatively flat simple hierarchies with all data in a relation model. Such technologies and the use of flat simple hierarchies consequently limit the depth of hierarchies from the standpoint of complexity of the data model and queries that must be run against the data models. The breadth of the hierarchies are also limited due to performance limitations from complex queries. Attempts to use a relational model to implement a capability of dynamically detecting changes in extremely large datasets have failed due to relationship and query complexity. Consequently, organizations need a different model for effectively and efficiently monitoring, harvesting and assessing large amounts of dynamically changing data.

Security policy and attributes should be defined through a rational process and framework that quantifies an organization's risk tolerance. Security frameworks such as the Sherwood Applied Business Security Architecture (SABSA) provide a mechanism for achieving this definition, and serve as a foundation for delivering National Institute of Standards and Technology (NIST)-compliant security configurations for multi-tenanted public/private/hybrid cloud environments. This will significantly simplify security certification and management and, when coupled with the choreography/orchestration/integration approach described above, allow the environment to dynamically evolve at runtime to serve new customers and applications based on customer risk tolerance coupled with security policy, and minimize the risk of unauthorized operations occurring.

Cloud computing has offered us a unique opportunity to build an approach that can be leveraged. This approach has the potential to provide significant new capacity to any customer environment that wishes to measure, monitor, analyze, and automate security decisions based on tolerance and security policy. This becomes particularly important when the organization is dealing with security classifications of data and the security policy and rules around those data classifications, as the approach will have the capacity to and monitor the authorizations for access to this data.

SUMMARY

What is needed is a system and method that overcome the disadvantages of described above. What is needed is a system and method for providing a scalable semantic mechanism for policy-driven assessment and action taking on dynamically changing data. These and other advantages are provided by a system that includes a plurality of servers accessible via network connection by users of an enterprise, in which the plurality of servers provide the execution environment for a policy context that is a polymorphic collection of ontologies that capture governance policies of the enterprise in a semantic, declarative grammar and is persisted in a semantic database running on one or more of the plurality of servers; a performance context that receives and stores data output from sensors monitoring managed assets of the enterprise and is persisted in a time-series database running on one or more of the plurality of servers; a workflow context that determines and directs the workflow process necessary to manage the managed asset based on the governance policies captured in the policy context and sensor data stored in the performance context and is implemented using a workflow engine that supports a declarative workflow definition language and which is running on one or more of the plurality of servers; a decision context that contains business rules encoded in a declarative grammar and is implemented using a business rule engine running on one or more of the plurality of servers and in which the business rules define conditions under which a managed asset or a managed asset setting must be started, stopped or assigned a specific value; and an adjudication context that defines all associations between the policy context, performance context, workflow context and decision context that are necessary to monitor and manage the enterprise managed assets, is semantic and declarative and is implemented using a semantic database running on one or more of the plurality of servers.

These advantages and others are also provided by a method for providing a scalable semantic mechanism for policy-driven assessment and action taking on dynamically changing data. The method defines a policy context for an enterprise that is defined based on user inputs and policy document of an enterprise received by one or more servers that provide a semantic database in which the policy context is defined and the defining includes creating ontologies that capture governance policies of the enterprise in a semantic, declarative grammar; defining a performance context for the enterprise based on received user input, the policy context, an identification of managed assets of the enterprise, and the managed assets that must be managed per the policy context and the defining defines the performance context in a declarative grammar and deploying the performance context in a queryable time-series database that executes on the one or more servers; defining a workflow context for the enterprise based on user input of actuators available to adjust setting on managed assets, known information regarding operation of such actuators, and the settings of managed assets and defining includes serializing the workflow context in a declarative grammar and deploying the workflow context in a queryable workflow engine that executes on the one or more servers; defining a decision context for the enterprise, in which defining a decision context for the enterprise includes setting thresholds and acceptable levels for managed assets and otherwise setting business rules for the enterprise and the defining includes serializing the decision context in a declarative grammar and deploying the decision context in a queryable business rules engine that executes on the one or more servers; and defining an adjudication context for the enterprise, in which the defining an adjudication context maps each managed asset to its parameters and links the policy context, performance context, workflow context and decision context and defining an adjudication context includes serializing the adjudication context in a declarative grammar and deploying the adjudication context in a queryable environment semantic database that executes on the one or more servers.

BRIEF DESCRIPTION OF DRAWINGS

Embodiments are described with reference to the following drawings in which.

DETAILED DESCRIPTION

Described herein are embodiments of a system and method for providing a scalable semantic mechanism for policy-driven assessment and action taking on dynamically changing data. Embodiments provide a complex orientation and decision analytics system. Embodiments overcome the problems described above. For example, embodiments of the system and method combine autonomic regulation of assets (e.g., c cloud-hosted assets) with policy traceability and drill-down. Embodiments combine a semantic representation of policies and assets (e.g., people, networks, and other assets) with declarative rules, scripting, workflow, and time-series technologies. Embodiments of the system and method are designed to accept user-driven ontological and rule changes. Embodiments provide a complete solution for delivering user-driven governance and demonstrable compliance (e.g., to the cloud). Embodiments allow users to model new policies, and to predict the impact of pending policy changes.

Embodiments provide a complex orientation and decision-making ("decisioning") analytics (CO&DA) system and method that provides a policy-driven rapid analytic capability for massive amounts of dynamic data upon which action may then be based. Embodiments securely deliver iterative implementation of secure services within organizational risk tolerance, with mission, security and performance metrics aligned into a common view, providing a command-and-control model for managing resources in a dynamic threat environment. While embodiments described herein provide such capability for a cloud-based environment, embodiments may also provide a new, semantic and rules-based mechanism for resolving issues in the analysis of data in other domains, such as healthcare fraud and open-source analysis. Similar issues are present in these domains—too much information that is rapidly changing and the difficulty in prescribing specific analysis techniques and algorithms to identify unknown patterns of interest.

Figure 1:
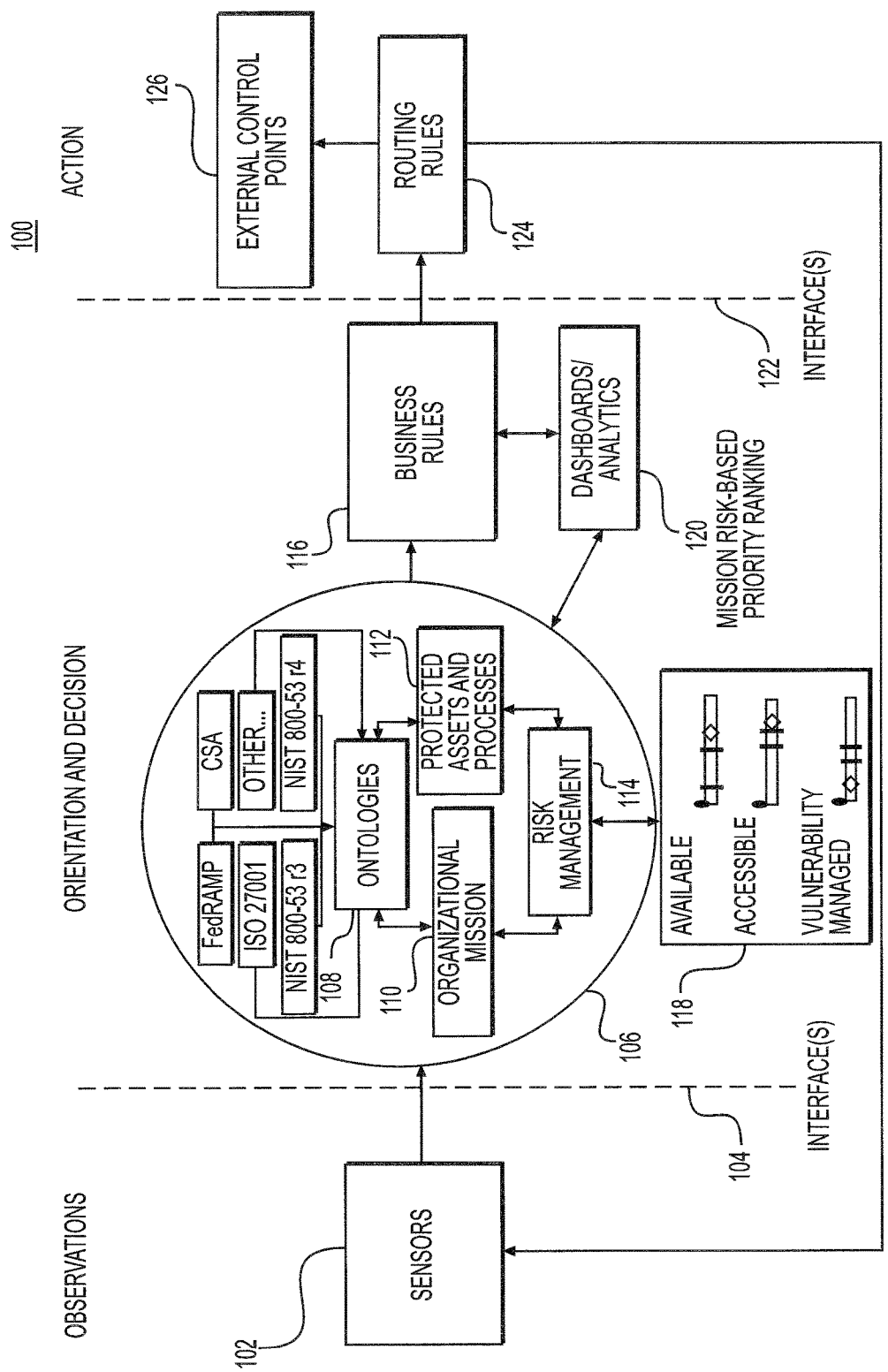
FIG. 1 is a block diagram illustrating an embodiment of a system for providing a scalable semantic mechanism for policy-driven assessment and action taking on dynamically changing data.

With reference now to FIG. 1, shown is a block diagram illustrating an embodiment of a system 100 for policy-driven assessment and action taking on massive amounts of dynamically changing data. The system 100 shown in FIG. 1 may be implemented using one or more computer programs that harvest or scan source data items and monitor for changes in specified attributes. The monitoring may include evaluation against declarative logic encapsulated in the aforementioned business rules. The business rules may use semantic ontologies to encapsulate monitored metrics. Based on the evaluation of detected changes, the computer programs may decide to take certain actions, thereby responding to the changes. The computer programs may be implemented as daemons in multitasking computer operating systems.

Embodiments of the system 100 (and method) for policy-driven assessment and action taking on massive amounts of dynamically changing data described herein may implement an observe-orient-decide-act ("OODA") loop. An OODA loop is well known to those skilled in the art of system decision-making processes. For example, as shown embodiments may:

Accept inputs from sensors, applications, data streams, etc. (Observe);
Perform associations with numerous data sources and apply numerous ontologies to the observed data (Orient). These associations create a continuously updated context of the managed environment based on harvested data (e.g., metadata) from the observations as assessed against the ontologies of structured policies and the relationships within and between them;
Use business rules for evaluation of semantic search results (Decide); and
Use workflow and application interfaces for fine-grained outcome direction based on the results of business rule evaluations (Act).

Accordingly, with continuing reference to FIG. 1, embodiments of system 100 may be thought to include an observations portion, an orientation and decision portion and an action portion. As such, in embodiments, system 100 may include a plurality of sensors 102 or may receive a plurality of outputs received from sensors 102 which are separate from system 100. The sensors 102 or the sensor outputs may be the observations portion of system 100. Sensors 102 may include monitoring tools (e.g., sensors, tools and devices that monitor assets of an enterprise, e.g., networks, machines, computers, environments, personnel, etc. for, e.g., security issues, risks, events, environmental conditions and other data that is ordinarily monitored and issues alarms, reports, notices, readings, etc. based on the monitoring), orchestration tools (e.g., tools that orchestrate processes and may issue alarms, reports, notices, etc. regarding the processes), and virtually any other device that produces data streams that need to be monitored. An important feature of embodiments described herein is that system 100 may receive and process a large variety or types of data. Furthermore, in embodiments, sensors 102 output massive amounts of data that are processed by system 100, specifically by orientation and decision and action ports. Such outputs from sensors 102 may be transmitted over a network and received as system 100 inputs through interface(s) 104. Such interface(s) 104 may be web service interfaces, such as RESTful™ web services.

With continuing reference to FIG. 1, orientation and decision portion of system 100 includes a holistic, mission-driven security framework and metadata model 106 that drives and implements standard-compliant (e.g., FISMA; HIPAA; Cloud Security Alliance, etc.) security solutions. Embodiments may leverage SABSA to enable integration with governance, operations and management, analysis of resource conflicts and forbidden combinations, and extensibility to all mature virtualization environments. No known providers currently provide or are considering such holistic solutions.

System 100 receives and processes massive amounts of data, the outputs from sensors 102, using model 106. Model 106 includes and applies a plurality of ontologies 108, organizational mission data 110, protected assets and processes data 112 and risk management data 114 to the data received from sensors 102. Ontologies, in general, are formal explicit descriptions of concepts in a domain of discourse (classes or concepts), properties of each class/concept describing various features and attributes of the concept (slots, roles or properties), and restrictions on slots, roles or properties (facets, role restrictions or property restrictions). In embodiments, the enterprise or other organization utilizing system 100 may define the ontologies 108 that are applied to the data by model 106. The ontologies 108 may include many hierarchies of data, including assets (e.g., managed or affected assets), attributes, compliance information, configuration, enterprise (e.g., the affected organization or sub-organization). The ontologies 108 may have different timescales relating to when attributes are created and how long they persist, e.g., based on the ontology relation to a given mission, protected assets/processes and priority ranking. Ontologies 108 may implement different control sets, e.g., standards or regulation-based control sets such as ISSO, NIST, CSA, FedRamp, etc. The ontologies 108 may be based on the organizational mission data 110, protected assets and processes data 112 and risk management data 114. System 100 enables enterprise users to view such data on, e.g., a system 100 display (e.g., dashboard/analytics display 120), and define classes, attributes, features, roles/proprieties and restrictions, e.g., through system 100 display. In embodiments, ontologies 108 describe the relationships among the business rules 116 that are applied to the data received from sensors 102 so that business rules 116 are applied consistent with the organizational missions and other organizational policies. System 100 applies the ontologies 108 to the dynamically received data from the sensors 102, placing the data within a semantic data structure based on the ontologies 108. Business rules 116 that make decisions on what actions to take are then applied to this structured data.

Organizational mission data 110 captures the missions and policies of the applicable enterprise or other organization. Organizational mission data 110 may be input by certain organizational users. Such mission data 110 may help determine when particular alerts, etc., are important (e.g., when they indicate an event that would impact an organizational mission), how important, and when not important. Protected assets and processes data 112 identifies particular protected assets and/or processes of an organization and may describe the level of protection for such assets and/or processes. This data 112 is particularly relevant when data received from sensors 106 is indicative of, e.g., an event affecting a protected asset or process, and is, therefore, reflected in the ontologies 108 and business rules 116. Risk management data 114 may include inputs received from organizational users (e.g., an administrator). Such inputs may be in the form of a sliding scale (a sliding bar) mission risk-based priority ranking metrics 118. The priority ranking may indicate the recommend ranges for a variety of risk settings, default settings and a user's selected risk settings.

With continued reference to FIG. 1, the orientation and decision portion of system 100 may process the data from sensors 102 using the model 106. System 100 may then apply a plurality of business rules 116 to the ontologically organized data from the sensors 102. The business rules 116 are defined by the enterprise (e.g., by designated organizational users) to generate actions based on the data received from sensors 102. Business rules 116 are applied based on the ontologies 108, organizational mission data 110, protected assets and processes data 112 and risk management data 114, e.g., in an OODA loop. In other words, orientation and decision portion of system 100 determines associations between the data (and the data sources—i.e., the sensors) and the business rules 116 based on the ontologies 108. Decision portion of system 100 may then generate an action or actions based on the application of the business rules 116 to the data from the sensors 102 and the priority ranking metrics 118 included in the risk management data 114. Actions may include instructions to be executed, e.g., by external control points 126, actuators (not shown) and a virtualization management suite or other devices that may manage or otherwise control settings for managed assets.

Action portion of system 100 may receive actions from decision portion of system 100, e.g., through interface(s) 122. Action portion may apply routing rules 124 to determine where to route such action instructions to the appropriate external control points 126. Such actions should have an environmental or process effect that is detected by sensors 102. If such effect produces desired changes, system 100 should cease requiring such action. However, as part of OODA loop, if the action does produce desired effect, data from sensors 102 should reflect this fact, and system 100 may require more of the action or additional action(s).

Embodiments may provide the following significant features:

Complexity reduction—a major aim of embodiments of the system 100 for policy-driven assessment and action taking on massive amounts of dynamically changing data is to reduce the complexity for organizational decision-makers. Embodiments may aggregate a variety of data sources and tools and apply business rules to provide a unified, organizational-wide mission driven approach to decision making.

Mission Driven Approach—embodiments of the system 100 may use a SABSA business driven security architecture model to deliver a mission driven approach to security. This is not a one size fits all approach, but rather provides a system that can be tailored to fit to each organization's risk tolerance quickly Rules definition—an important feature of embodiments exists within the business rules implemented by the system 100. A user sets the priority of the rules, the organization's risk tolerance and provides what data to measure and monitor. The system 100 follows the rules and either executes the directives or queues up the needed security action in priority to the right person.

Semantic approach—embodiments use a semantic approach that allows for dramatic cardinality and scalability from a few security attributes to trillions of constraints and metrics.

Scalability—The extreme scalability of the semantic technology implemented by embodiments of the system 100 enables it to scale to meet the high demand of complex organizational demands even in large organizations.

Ease of Use—embodiments of the system 100 have embedded easy to use tools for rule development, as well as workflow development enabling non-technical business analysts the opportunity to interact with the system 100 without a programmer.

Security Process Auditability—Embodiments provide a record of security monitoring and action in a central depository for actions that in the past would often be manual and not easily auditable. For example, embodiments may provide a secure audit trail of the provisioning of users in an environment including all authorizations, de-authorizations, trainings, rules of behavior and many other user based security profile actions.

Control Set Flexibility—Embodiments of the system 100 are based on the mission of an organization and the risk associated with that mission; any control set (NIST, ISSO, CSA . . . ) can be attributed to this structure with minor changes. This is especially important when standards bodies upgrade controls. Embodiments of the system 100 will be able to quickly address those changes without major structural changes.

Embodiments of a system and method for policy-driven assessment and action taking on massive amounts of dynamically changing data are novel in that they store an unprecedented quantity and variety of runtime environmental data in a semantic database. Embodiments contain novel components to provide the same level of transactional integrity over constantly changing data that is usually expected of a relational database. In embodiments, any data that is not persisted semantically, such as metrics data, reporting algorithms, or provisioning scripts, is nonetheless query-able semantically using the SPARQL query language. No known system provides a semantic database with such functionality.

Embodiments a system and method for policy-driven assessment and action taking on massive amounts of dynamically changing data are also novel in that they provide a transaction management service that provides the same distributed transactional integrity that is expected of relational databases in a semantic triple store database implementation. No known system provides this functionality.

Embodiments a system and method for policy-driven assessment and action taking on massive amounts of dynamically changing data are also novel in that they provide a "training wheel module" that makes it easy for users to migrate relational data service operations to a semantic triple store with guaranteed atomicity, consistency, isolation and durability (ACID) compliant performance. The training wheel module enables users to perform a test migration on relational data service operations.

Embodiments of a system and method for policy-driven assessment and action taking on massive amounts of dynamically changing data provide colocation of data and analytics, supporting data mining on live data without requiring extract, transform and load (ETL) processes or data warehousing. Because embodiments of the system are data mining-friendly, a system rule repository easily accommodates both normative rules arising from regulations, and safe harbor rules arising from machine learning and predictive analytics. Embodiments of the system automatically learn from prior security or availability incidents and automatically improve countermeasures.

Embodiments of a system and method for policy-driven assessment and action taking on massive amounts of dynamically changing data are flexible enough to provide a constant level of customization, control and traceability, including in any combination of public, hybrid or private clouds that rely on any combination of enterprise virtualization management suites. Embodiments of the system and method may achieve this high level of flexibility through the use of multiple named graphs, a semantic technique that provides compartmentalization and encapsulation capabilities similar to those provided by object-oriented design, but which are much easier to integrate.

Use Cases

Figure 2:
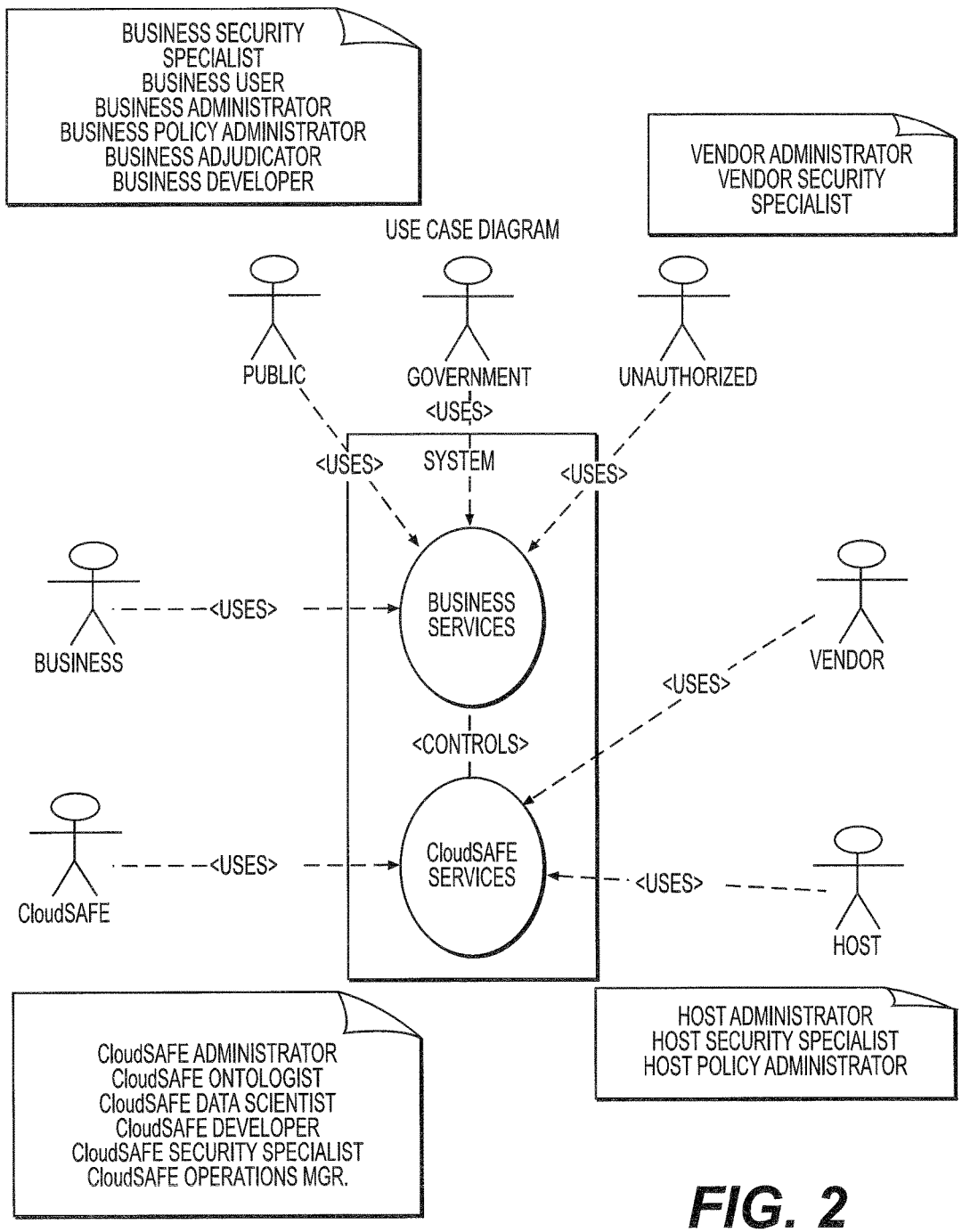
FIG. 2 is a diagram illustrating use cases for an embodiment of a system for providing a scalable semantic mechanism for policy-driven assessment and action taking on dynamically changing data.
Figure 3:
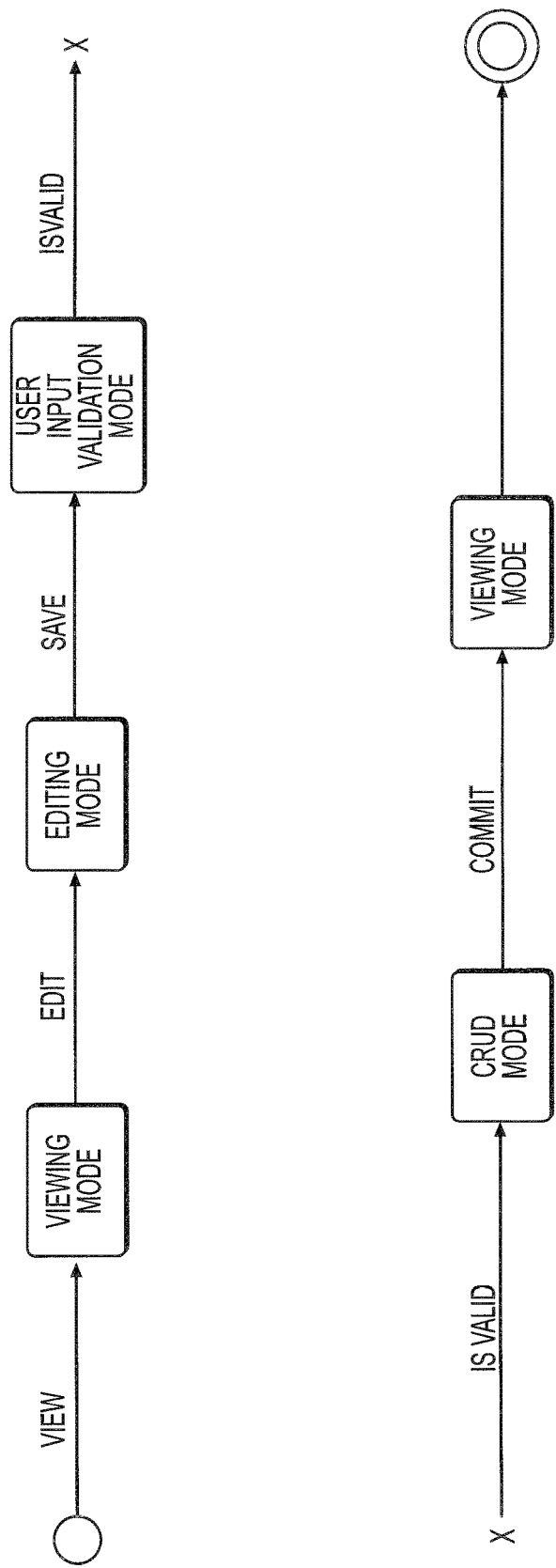
FIGS. 3-6 are state diagrams illustrating common actions taken using embodiments of a system for providing a scalable semantic mechanism for policy-driven assessment and action taking on dynamically changing data.

With reference now to FIG. 2, embodiments of a system and method for policy-driven assessment and action taking on massive amounts of dynamically changing data support a wide range of use cases. These use cases fill the needs of actors in multiple categories: business, host providers, software vendors, service providers, government and citizens. Embodiments provide a system for securing public or private clouds or data centers. Consequently, embodiments support interactions between many organizations and roles. At a high level, most use cases share a common core of four fundamental operations:

(1) Create, Read, Update or Delete (CRUD) Operations on Policies, Rules and Thresholds;
(2) Provisioning a New Asset;
(3) Submitting a Reporting Request; and
(4) Autonomic Response Although the actors, items and tasks may vary, these four patterns of activity are repeated in all use cases. The major use cases are listed below, followed by the four patterns of activity common to all use cases, defined as state change diagrams seen in FIGS. 3-6.

Business Use Cases

Business User. A business user is a customer who seeks to perform business-related tasks on applications deployed in a secured environment of the embodiments described herein.

Business Security Specialist. A business security specialist is a customer whose role is to ensure that business users enjoy the appropriate level of security.

Business Administrator. A business administrator is a customer whose role is to configure and manage business applications to support the needs of business users. This includes most employee onboarding and off-boarding tasks.

Business Policy Administrator. A business policy administrator is a customer whose role is to define the organization's business policies by managing the customer's named graph (private ontology) in the system, down to the business-technical frontier. This person defines attributes, strategies, and objectives, in the ontology.

Business Adjudicator. A business adjudicator is a customer whose role is to define concepts in the customer's named graph (private ontology) below the business-technical frontier. This person defines methods, rules, metrics and thresholds in the ontology.

Business Developer. A business developer is a customer who develops software applications for the customer's business. The business developer may deploy the applications in the system or may hand them off to a business administrator for deployment.

Systems Use Cases

System Administrator. This person adds customers (entire enterprises) to a system-secured environment through credentialing and through updates to the system ontology.

System Ontologist. This person is responsible for making systemic modifications to system ontologies and for external ontology matching and integration tasks.

System Data Scientist. This person performs machine learning tasks to allow system to make proactive predictions, primarily from collected metrics and external events.

System Developer. This person develops the autonomic and machine learning applications that comprise the system runtime environment.

System Security Specialist. This person maintains system security both proactively and forensically.

System Operations Manager. This person is responsible for monitoring system operations to maintain agreed-upon levels of service (SLAB), to maximize order fulfillment rate and to minimize provisioning delays.

Host Use Case

Host Administrator. A host administrator is an employee of a system-secured data center or cloud provider whose role is to administer the host environment.

Host Security Specialist. A host administrator is an employee of a system-secured data center or cloud provider whose role is to ensure the security of the host environment.

Host Policy Administrator. A host administrator is an employee of a system-secured data center or cloud provider whose role is to define policies (both security policies and business policies) for the host provider. These policies may be ontologized and added as a named graph in the system ontology.

Vendor Use Cases

Vendor Administrator. A vendor administrator is an employee of a software or hardware company whose role is to manage major deployments of the vendor's hardware or software in the host provider's environment. The vendor administrator may work with a system ontologist and a system administrator to enable embodiments to capture metrics from the new hardware and software.

Vendor Security Specialist. A vendor security specialist is an employee of a software or hardware company whose role is to manage the initial configuration and implementation of security measures for new deployments of the vendor's hardware or software in the host provider's environment. The vendor security specialist may work with a system ontologist and a system administrator to make sure that embodiments can capture and fulfill the vendor's security requirements.

Public Use Cases

Government Use Cases. Depending upon the customer's needs, government officials may have direct access to system-secured applications, data and services.

Citizen Use Cases. Depending upon the customer's needs, citizens may have direct access to system-secured applications, data and services.

Unauthorized Use Cases. Embodiments follow the best practices of cloud providers in expecting there to be an unauthorized user (or attempted user) somewhere in the system at all times. By considering the unauthorized user as an actual user, embodiments can conceptualize and ontologize him, and can more fully define workflows to deal with him, including the ability to automatically learn from past experiences and improve countermeasures.

Figure 8:
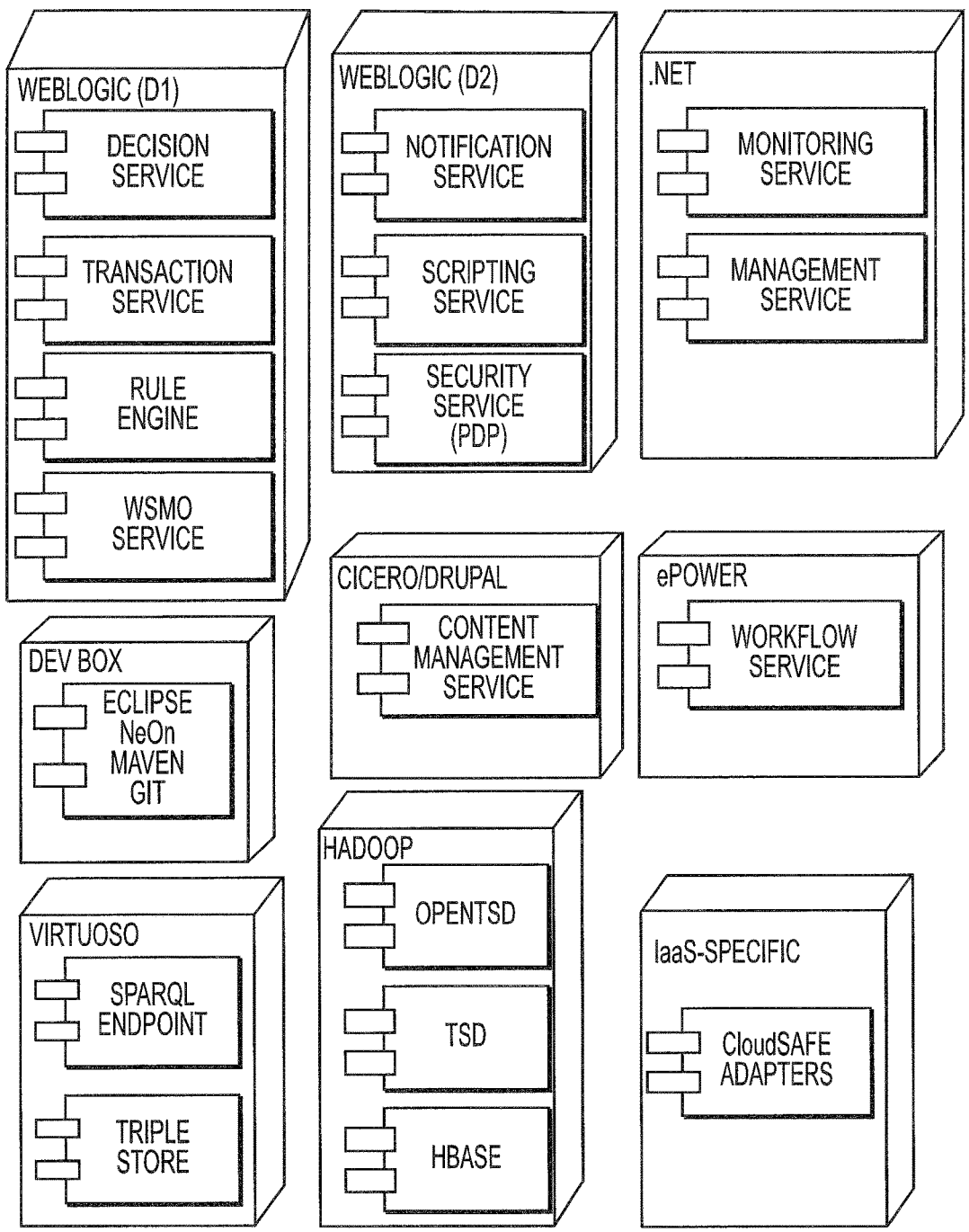
FIG. 8 is a block diagram illustrating services used to implement an embodiment of a system and method for policy-driven assessment and action taking on massive amounts of dynamically changing data.

The interactions of the various actors in their roles are described graphically in FIG. 8 (in which embodiments are referred to as CloudSAFE, which represents a cloud-based implementation).

CRUD Operations on Policies, Rules and Thresholds

Many use cases involve an actor who must create, read, update or delete ("CRUD") an ontological concept. As discussed in greater detail in the Components section, the system-ontology contains a hierarchy of policy concepts. These concepts start at a high, abstract, business-oriented level and become increasingly specific until they terminate at a precise, technical level of rules, collected metrics and thresholds. The general scheme is: Attribute, Strategy, Objective, Method, Rule, Metric and Threshold. There are also user-defined hierarchies for network concepts, organizational concepts, and computational asset concepts. All of these concepts, and the relationships between them, are subject to CRUD operations. When such CRUD operations take place, the system encounters the state changes defined in the diagram shown in FIG. 3.

Provisioning or De-Provisioning an Asset

When an asset (which can be tangible like a virtual machine or more abstract like a web cache) is provisioned or de-provisioned, the system must perform a number of operations.

(1) It must create the actual thing (like a virtual machine);
(2) It must confirm that it was created properly and is in its correctly configured initial state;
(3) It must add it to the ontology;
(4) It must begin collecting metrics from the asset, and confirm that the metrics are being generated and collected properly;
(5) And it must allow users to associate business rules, thresholds, and workflows with the asset.

Figure 4:
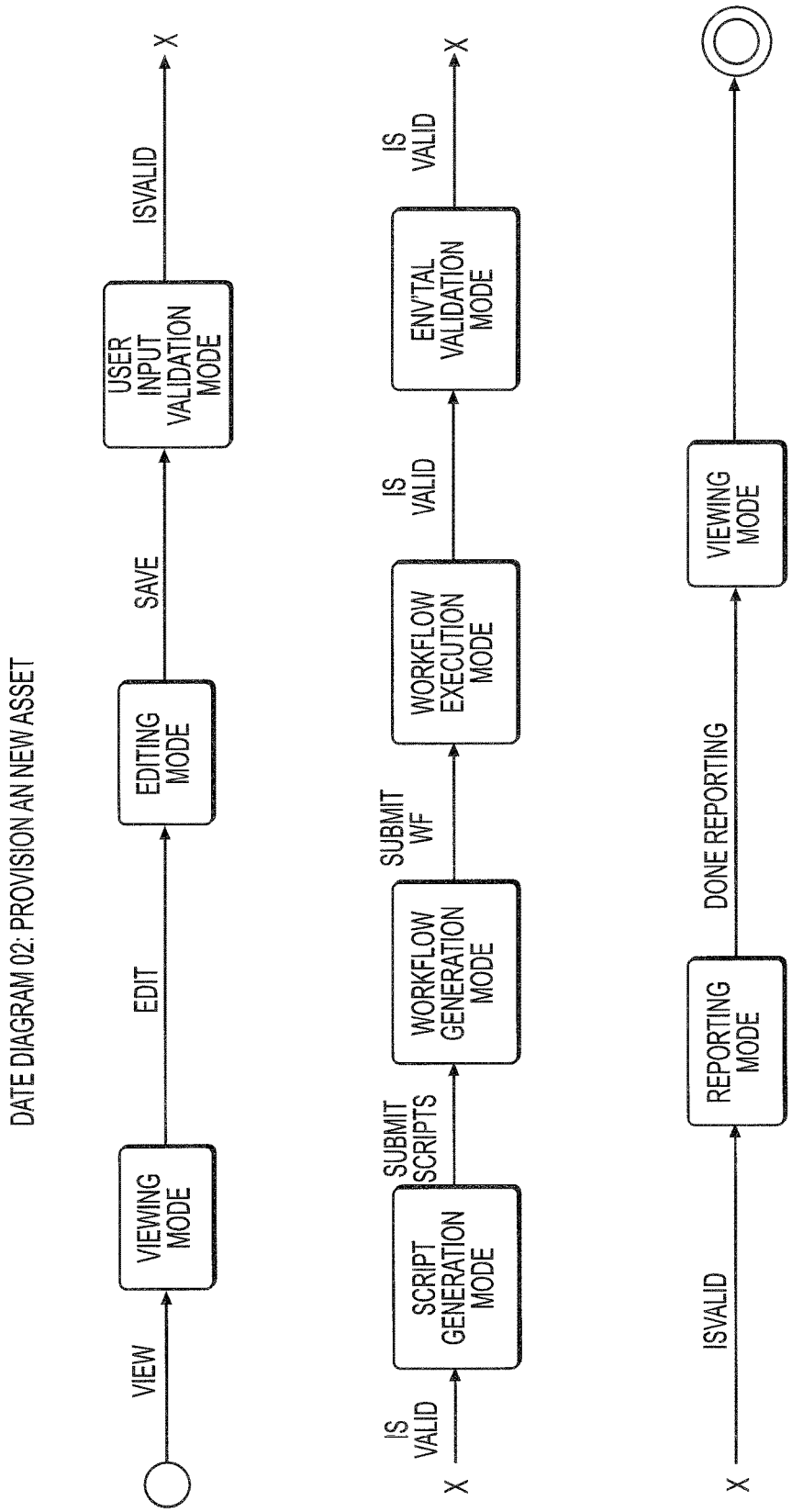

As it performs these tasks, the system goes through the state changes defined in the diagram shown in FIG. 4.

Submitting a Reporting Request

A unique and powerful feature of embodiments is its ability to demonstrate compliance. The emergence of "demonstrable compliance" as an enterprise architectural requirement in both industry and government has become a driver for technological innovations that can add insight, remove ambiguity or imprecision, and decrease reporting costs and time to completion. Embodiments provide user friendly, precise and unambiguous traceability and drill-down, from the most abstract business perspective down to the most technical threshold perspective. The system-ontology is expressive enough to capture user-defined concepts, and flexible enough to capture real-world phenomena such as metrics. It preserves contextual items such as history and dialogue. The system ontology also captures system-generated items such as machine learning classifications or predictions that were applied in a given case.

Figure 5:
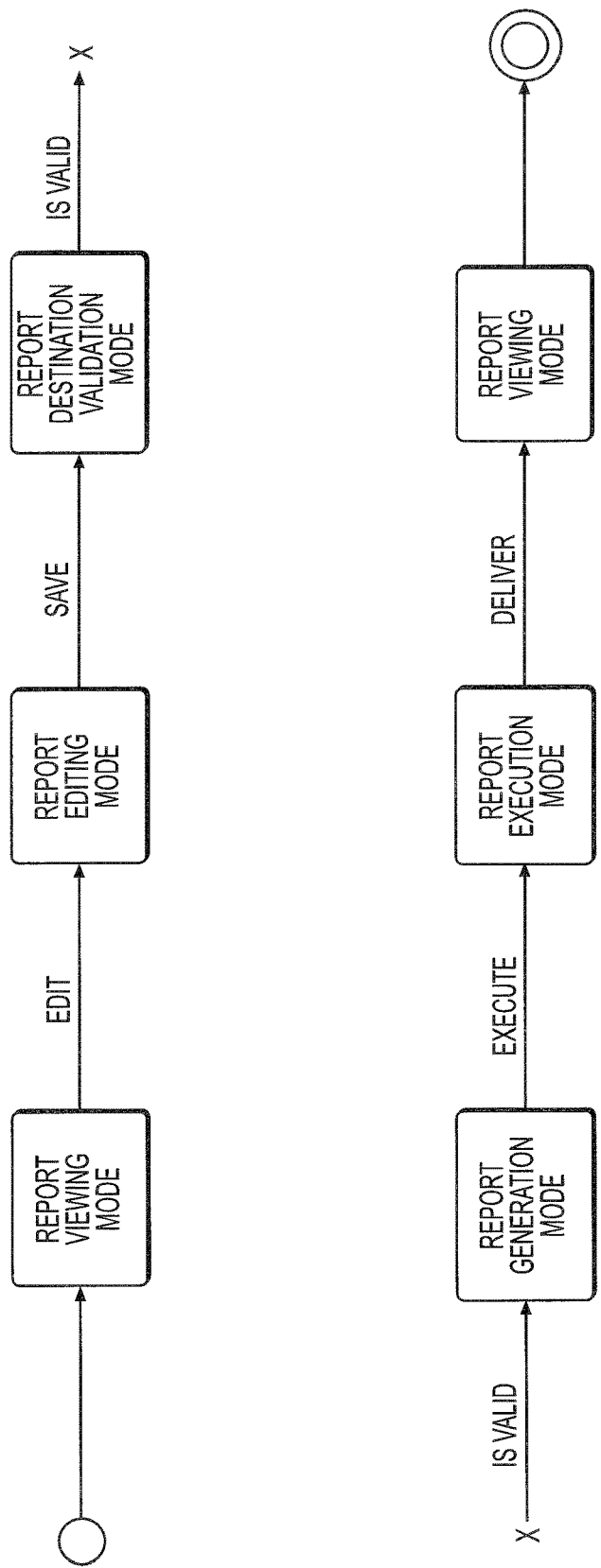

When the ontology receives a reporting request, it undergoes the state changes defined in the diagram shown in FIG. 5.

Autonomic Response

Embodiments constantly monitor the cloud or data center environment and responds automatically to internal or external events or metrics that violate rules. Embodiments also apply predictive models to respond to conditions that are likely to cause a future violation of rules. Responses may be synchronous or asynchronous and may or may not involve human tasks. Embodiments may use ePower for workflow definition and execution, and may use a domain specific language on a Camel-supporting Enterprise Service Bus (ESB) for low-level message propagation.

Figure 6:
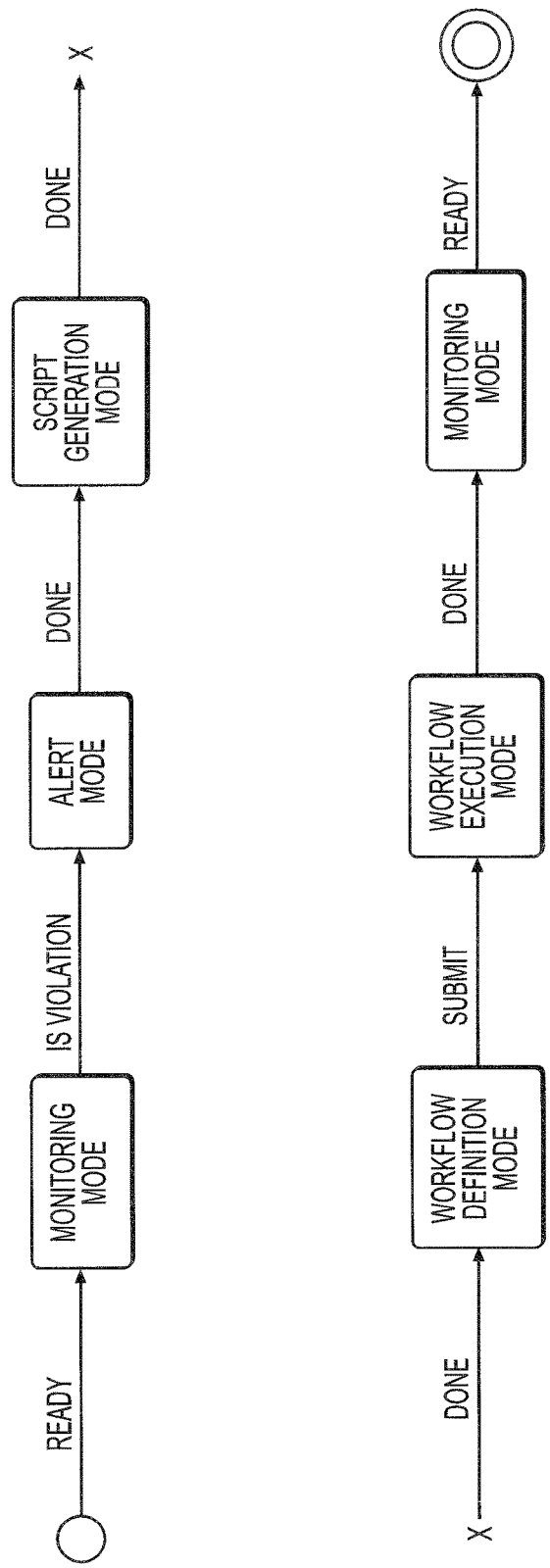

The autonomic response activities contain the state changes defined in the diagram shown in FIG. 6.

Figure 7:
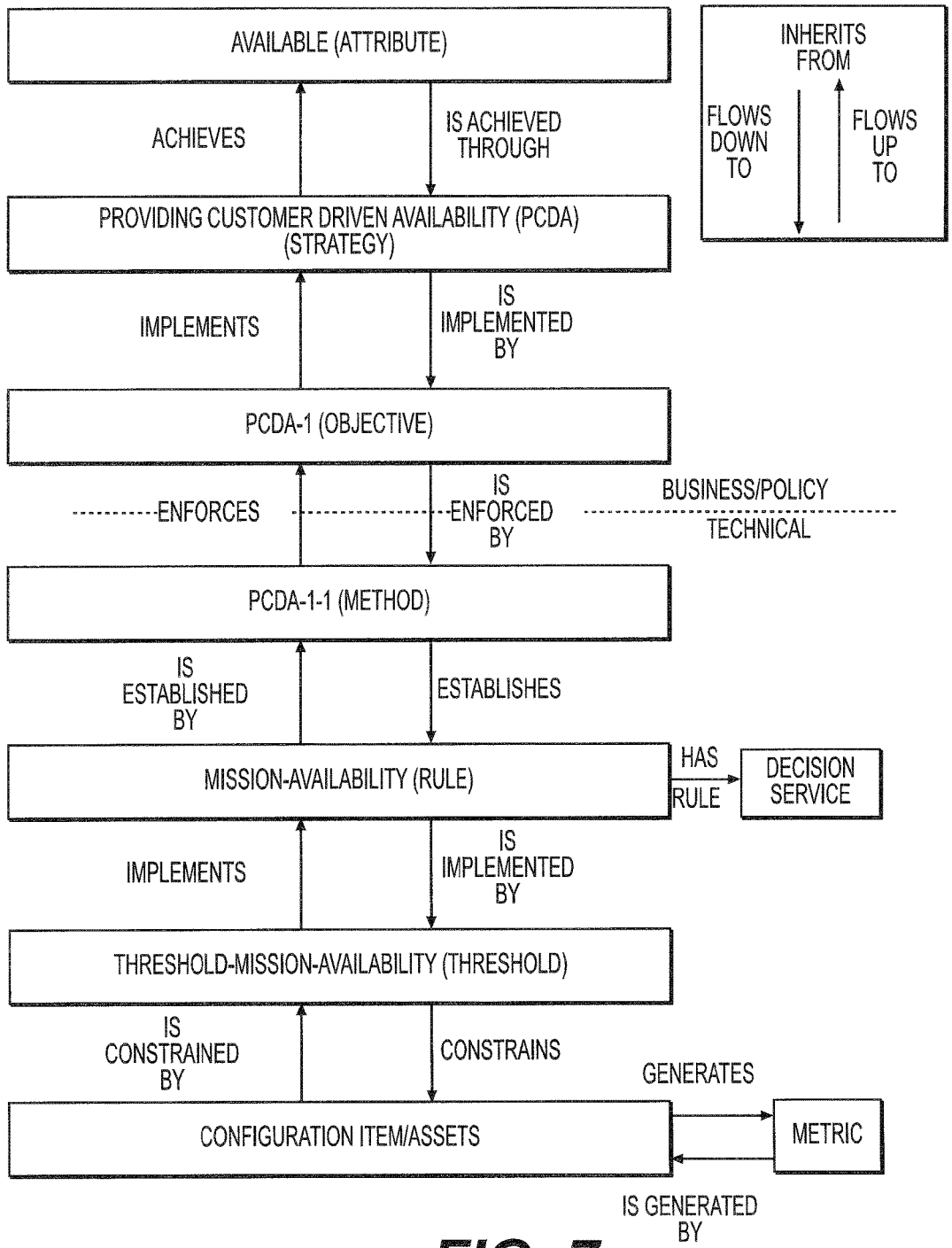
FIG. 7 is a diagram illustrating an ontology used in an embodiment of a system and method for policy-driven assessment and action taking on massive amounts of dynamically changing data.

In order to tackle the concept of massive amounts of data, embodiments of the system and method for policy-driven assessment and action taking on massive amounts of dynamically changing data involve a novel mechanism to structure and describe the data. Embodiments may use two methods, a SABSA attribute concepts and semantic processing. Semantic processing uses the concept of ontologies to store and organize data. System ontologies may be implemented using a governance model aligned to various standards, such as the NIST 800-53, Cloud Security Alliance, HIPAA, and PCI. These ontologies are reusable for different implementations. Likewise, adding ontologies to the system is not difficult. With reference to FIG. 7, the ontology shown illustrates how the ontological concept of the system and method for policy-driven assessment and action taking on massive amounts of dynamically changing data naturally flows downward for a typical attribute hierarchy subset, and also upward, showing traceability to the mission. What also can be seen is the clear distinction between the business policy view above and the technical operational view below. The flow between the two views is important because most of the time this is where the miscommunication in organizations occurs. Semantic technology is well-suited for representing concepts, and the relationships between them, that are hierarchical, polymorphic, and user-driven.

With reference now to FIG. 8, shown is a block diagram illustrating services 800 used to implement an embodiment of a system and method for policy-driven assessment and action taking on massive amounts of dynamically changing data. Embodiments of the system and method described herein may use these system services 800 to provide the features described herein. The system services 800 may be provided by one or more computer programs, e.g., daemons, described above with reference to FIG. 1. The system services 800 may be each implemented as one or more modules within one or more computer programs. A system service 800 may be implemented by itself in a computer program or combined with other system services 800. The diagram in FIG. 8 identifies example implementation technologies and network topology at a high level. The system services 800 are shown organized into groupings of services that may be instantiated on a variety of servers, frameworks and databases.

It is noted that the organization of system services 800 shown is an illustrative implementation and that the groupings of system services and organization shown may be significantly varied. For example, services 800 that are shown grouped on separate servers may be instead be grouped on the same server. Likewise, services 800 may be split further and instantiated on additional separate servers. As a specific example, the notification service, scripting service and security services (PDP) may be run on a separate Java application enterprise (JAE) server from decision service, transaction management service, rule engine and WSMO service. These services may instead be located on one JAE server. Alternatively, one or more of the services may be instantiated on separate servers. Additionally, types of servers, frameworks and databases shown, such as Weblogic, .NET, Hadoop and Virtuoso are for illustrative purposes only. Embodiments may be implemented with other types of JAE servers, Windows servers, commodity server clustering frameworks and databases.

The services 800 shown include the previously mentioned notification service, scripting service, security services (PDP), decision service, transaction management service, rule engine and WSMO service instantiated on JAE server(s). The system services 800 may also include a monitoring service and management service on, e.g., a windows server, a continuous integration environment, (e.g., Eclipse Neon Maven Git, an environment created from four (4) different open source packages, Eclipse, an integrated development environment, DSpace Git, a repository, Apache Maven, a build automation tool used primarily for Java projects, and Neon, an HTTP and WebDAV client library, with a C interface) on, e.g., a development box, a content management service on, e.g., a wiki framework (e.g., Cicero/Drupal), a workflow service (e.g., on a Northrop Grumman Corp. ePower product, a SPARQL (a resource description framework (RDF) query language for databases) endpoint and triple store in a database (e.g., a Virtuoso database), OpenTSD, TSD and Hbase on a commodity server clustering framework (e.g., Hadoop), and, for a cloud implementation, CloudSafe adapters (e.g., on a IaaS API).

With continuing reference to FIG. 8, the following is a description of implementations of various system services 800 in an embodiment of system and method for providing a scalable semantic mechanism for harvesting, assessing and eliciting on dynamically changing data.

Triple Store

Embodiments of the system and method use a RDF triple store to persist user-defined and system-defined concepts and relationships. In embodiments, system concepts are Web Ontology Language (OWL) 2.0-compliant. The triple store implementation used may be OpenLink's Virtuoso Universal Server. Embodiments use named graphs to distinguish between the public default system ontology and customer's ontologies. Named graphs are a key concept of semantic web architecture in which a set of RDF statements (a graph) are identified using a universal resource identifier (URI). This allows descriptions to be made of the RDF statements context, provenance information and other metadata. Named graphs are a simple extension of the RDF data model through which graphs can be created.

The public default ontology allows new customers to access embodiments of the system initially. The public default ontology also supports semantic interaction with external knowledge bases and ontologies. By using secured named graphs, embodiments guarantee that customers are isolated from each other and from the public graph. The default public graph contains hierarchical concepts for policies; assets; customers; users; networks; and configuration items. The default public graph's policies decompose hierarchically to attributes; strategies; objectives; methods; rules; thresholds; and metrics. Methods and below leverage a technical vocabulary. Objectives and above leverage a business vocabulary. Concepts at the control level support Web Service Model Ontology (WSMO) bindings, to provide a semantic interface with the decision service and the workflow service. The public default ontology contains several hierarchical transitive properties, which provide the capability to query hierarchical constraints (such as policy or ownership constraints) with short, concise and elegant SPARQL queries.

In an embodiment, the "bottom third" of the public default ontology may be integrated with WSMO and OpenTSDB (a distributed, scalable time series database (TSDB). The bottom third of the public default ontology defines concepts of assets, thresholds, metrics, tags, rules, parameters, and the relationships between them. The public default ontology allows users to create any arbitrary number of parameters per rule (formerly only maximum and minimum values were allowed). The public default ontology also allows users to associate any collection of user-defined tags with a metric. Users can also define any number of metrics.

The public default ontology succeeds in integrating RDF data in, e.g., Virtuoso and OpenTSDB data in HBase (a column-oriented database management system) without duplicating HBase data. Only metric ids and tag ids that are actually used in rules are duplicated in the ontology, and they are only defined once, regardless of how many rules they appear in or how many assets they constrain.

The public default ontology also supports two levels of aggregation. As described below, both OpenTSDB and OpenRules (a general purpose business rules and decision management system) support aggregation (maximum, minimum, average, ceiling, floor, etc.). The ontology succeeds in defining aggregate rules only once, and supports highly efficient one-time rule evaluation for aggregate rules. Rules that involve metrics that are aggregated in OpenTSDB are called "pre-aggregated rules" in the ontology, because OpenTSDB constantly updates aggregate values on HBase for these metrics. Rules that are aggregated in OpenRules are called "aggregated rules" in the ontology, because they are aggregated upon rule invocation (not beforehand).

The public default ontology allows users to define thresholds by asset class or by asset instance. Asset instance thresholds override asset class thresholds. This provides the maximum level of flexibility for users, and also prevents relentless and largely fictitious sub-classing that relational database schemas frequently resort to in order to achieve flexibility.

The public default ontology leverages inverse, transitive and super-properties in order to simplify SPARQL queries. Ignoring inverse and super-properties, the sixteen material statements in the bottom third of the public default ontology are as follows:

:Rule :isPreAgreggated Boolean
:Rule :isAggregated Boolean
:Rule :hasRuleIdentifier String #matches OpenRules Rule Identifier
:Rule :hasParameter :Parameter
:Rule :hasThresholdIdentifier String #matches :Threshold.ThresholdIdentifier
:Parameter :usesMetric :Metric
:Metric :hasMetricIdentifier Sting #matches OpenTSDB Metric UID
:Metric :hasTCollectorScript :Script #identifies TCollector script
:Metric :isGeneratedBy :Asset
:Metric :hasPreAggregatedThreshold :Threshold
:Metric :hasAggregatedThreshold :Threshold
:Asset :hasTag :Tag
:Tag :hasTagIdentifier String #matches OpenTSDB Tag Identifier
:Asset :hasThresholdConstraint :Threshold
:Asset :isConstrainedBy :Rule :Threshold :hasThresholdIdentifier String #matches :Parameter.ThresholdIdentifier By querying the ontology with SPARQL, the WSMO services are able to identify all rules, thresholds, metrics, and tags that relate to an individual asset (or to an asset type) and marshal them into the correct syntax for an invocation of the Decision Service.

SPARQL Endpoint

Embodiments of the system and method use a SPARQL 2.0-compliant endpoint to allow queries and create, read, update or delete ("CRUD") operations on the system triple store. In an embodiment, the SPARQL endpoint implementation is the Virtuoso Universal Server's SPARQL endpoint. Virtuoso supports both chaining and reasoning, using the Jena Reasoner.

Decision Service

With continuing reference to FIG. 8, embodiments of the system and method contain a decision service. The decision service allows highly scalable, stateless, RESTful invocation of the rule using JavaScript Object Notation (JSON) over HTTP. In an embodiment, the decision service may be implemented in Java as a Jackson-Jersey REST application. The decision service maximizes scalability by marshaling related metrics and thresholds into stateless JSON messages for evaluation by the rule engine. The decision service can submit both single-instance and aggregate rules. The ability to marshal aggregate rule requests and responses minimizes the amount of necessary network traffic. For instance, a rule may involve the standard deviation of the free disk space on all virtual machines of a certain category. The client sends a single JSON message with the free disk space of each virtual machine in the category. The decision service performs the standard deviation calculation according to the instructions in the rule. The decision service does not need to maintain state between multiple invocations (one per virtual machine).

In embodiments, the monitoring and management services invoke the decision service. Upon detecting the existence of a virtualized asset, these services invoke the decision service to determine whether the asset is operating within compliance of all applicable rules.

A primary focus in embodiments is to achieve truly cloud-level scalability in the decision service. Embodiments employ a three-part strategy toward this end:

Statelessness.

In embodiments, the decision service is handed everything needed to make a decision on every invocation. This includes both metrics and thresholds. In embodiments, the decision service does not chain decisions, does not make lookups or otherwise access external data, and contains no logic except for business logic.

Non-Interaction.

In embodiments, the decision service makes decisions based upon the parameters provided by the caller, and communicates the decisions in a reply to the same caller. In embodiments, the decision service does not change the state of any other system component or invoke any other system service. In embodiments the only exception is that it logs each rule invocation to TSDB so that a decision yield may be computed.

Decision Model.

In embodiments, the decision service uses Decision Model, which is an architectural discipline for stating all rules declaratively in plain English; normalizing them; and organizing them into flexible, scalable decision hierarchies. Leveraging the Decision Model allows the decision service to scale reliably to enforce an unlimited number of user defined rules (in embodiments, there is no administrator in the loop to update business rules).

Rule Repository

With continuing reference to FIG. 8, embodiments of the system contain a rule repository that is invoked by the decision service. Embodiments use the OpenRules Rule Engine for this purpose. OpenRules is an implementation of the Decision Model, which is a methodology and syntax for defining and de-normalizing business rules. Rules are represented declaratively in nearly plain English in spreadsheets. OpenRules parses the spreadsheets into executable code, with the result that there is no "dead documentation" phase to business rule implementation. This feature greatly enhances the demonstrable compliance capabilities of embodiments described herein.

Transaction Management Service

With continuing reference to FIG. 8, embodiments of the system and method may have unusually volatile data in the triple store. Most semantic knowledge bases in use today deal with concepts that evolve at a much slower pace, comparatively speaking, than the runtime environmental concepts in embodiments described herein. Furthermore, embodiments' triple stores contain information that is used to create bindings for distributed components such as web services, decision services, monitoring services and management services. The volatility and distributed nature of the data resembles enterprise relational data models, except that the hierarchical and user-driven characteristics of the data model make relational databases unsuitable for embodiments described herein. CRUD operations are performed via SPARQL statements to a SPARQL endpoint, but the SPARQL specification does not include declarative transaction boundaries. Embodiments of the system and method include a novel transaction management service that provides the same distributed transactional integrity that is expected of relational databases in a semantic triple store database implementation. No known system provides transaction management service that provides the same distributed transactional integrity that is expected of relational databases in a semantic triple store database implementation.

The novel transaction management service in embodiments described herein may be implemented using familiar Java Transaction API (JTA) inside of standard stateless and stateful session beans (EJBs). These EJBs can declare a transaction boundary, which may contain any number of distributed transactions using any combination of technologies (synchronous or asynchronous web services, message beans, remote procedure calls, etc.). In embodiments, all parts of the transaction either succeed or fail, in accordance with the voting features of the JTA specification. Semantic operations are handled inside the beans by treating Jena RDF API objects as List objects. For instance, the creation of a single virtual machine may result in the insertion of 50 triples, all of which must succeed or fail in their entirety to avoid orphaned and phantom records.

In embodiments, the transaction management service includes a "training wheel module" that makes it easy for customers to migrate relational data service operations to a semantic triple store with guaranteed ACID compliant performance. The purpose of the training wheel module is to help developers migrate a functionality that leverages a relational database with transactional guarantees, into the same functionality that leverages a semantic database with the same relational guarantees. The intent is that developers will use the training wheel module to confirm that they can migrate multiple relational database CRUD operations into multiple triple store CRUD operations, with the same transactional guarantees. Developers can use this EJB (by modifying it through inheritance) to wrap the CRUD operations in a transaction declaration. All of the CRUD operations must succeed or fail together. Developers can add their own validation code, etc. In an embodiment, the EJB communicates over a JTA-aware JDBC connection to a single relational database table called TRIPLE that has three String columns, "s" "p" and "o," so that each row in the table represents a single triple that would be stored in, e.g., Virtuoso. This allows developers to verify the transactional integrity of code that they refactor to use Virtuoso, before they have access to Virtuoso.

Workflow Mining Service

The workflow mining service provides a WSMO interface that allows the monitoring service to query the status of any workflow operations on an asset. For example, a virtual machine may be identified in the ontology. The workflow mining service will identify complete or running workflow instances that affected or are affecting the asset, and the exiting or current status of each instance. In an embodiment, the workflow mining service is implemented with two components: an OpenTSDB TCollector agent writes workflow metrics to OpenTSDB, and the WSMO web service queries OpenTSDB to retrieve the metrics.

Workflow Service

With continuing reference to FIG. 8, embodiments of a system providing a scalable semantic mechanism for harvesting, assessing and eliciting on dynamically changing data contain a workflow service that can execute micro, macro, automated and human tasks. The workflow service may be implemented using Northrop Grumman's ePower product. The workflow service may be invoked either through the workflow service's own GUI via an Administrator or automatically through a client API via the management service. The workflow mining service collects time series data from the workflow service, e.g., via a TCollector agent, which periodically queries the workflow service via a client API.

Time Series Database

Embodiments contain a time series database that stores metrics from all system components and services in a unified table space. Implementations may use OpenTSDB, which is an open source application that runs on HBASE on Hadoop. OpenTSDB is a highly scalable time series database solution. OpenTSDB achieves its scalability by using stateless RESTFul communications between two kinds of agents. The TCollector agents collect metrics from numerous system assets (virtual machines, applications hosted on virtual machines, network devices, physical platforms, etc.). The TCollectors send update messages over a TCP protocol to TSD agents, which act as session managers for reads and writes on HBASE. OpenTSDB's HBASE schema consists of two tables. One is a lookup table and the other is the single fact table. The fact table row key contains the metric id and a coarse-grained partial timestamp. The single column family contains a fine-grained partial time stamp, metric tag identifiers and values. The optimization of the schema, and especially of the row key, makes time series scans extremely efficient. Like all HBase tables, OpenTSDB's tables are persisted in sort-order. In OpenTSDB, this means first by metric, then by timestamp, and then by column qualifier (tag). This makes both seeks and scans extremely efficient. The agent-based read and write solution allows the system to scale infinitely without significantly increasing the load on the database. Because HBase is a column-oriented database, a single non-sharded instance of OpenTSDB easily accommodates 2^24 metric IDs (HBase primary keys) and 2^24 tags (HBase column qualifiers). This staggering capacity makes OpenTSDB uniquely appropriate for user-driven and dynamic environments, allowing users to define their own metrics and tags in real time, without supervision or cooperation by database administrators.

Log Mining Service

With continuing reference to FIG. 8, embodiments contain a log mining service whose purpose is to mine web logs to create OpenTSDB-compatible metrics. The Log Mining Service permits OpenTSDB to be used with third party tools that create voluminous near-real-time logs. Such tools include enterprise virtualization management software and enterprise network management software. The Log Mining service is implemented using the Hadoop Ecosystem utility Flume. Embodiments of the system provide a utility for associating the URI from the ontology of the log-generating asset with the OpenTSDB messages generated by Flume. As a result, both metrics that are generated by OpenTSDB TCollector agents, and metrics that are generated from third party logs and mined by Flume, will behave exactly the same. The metrics may be persisted to OpenTSDB in the same format. The metrics can be uniquely identified by their ontology URI, and can be combined or aggregated in time series queries without constraints.

Enterprise Virtualization Management Adapters

Embodiments provide adapters to popular public and private enterprise virtualization management suites, such as Amazon ec2 (public) and VSphere (private). Because of the latency and uncertainty inherent in virtualization operations, the Adapters are implemented as an asynchronous message bus using Camel. Camel is an open source message routing framework implemented in Java. Camel provides a domain specific language to support declarative and dynamic route-building and message-handling functionality. For each provisioning operation, a message route will be dynamically defined between the Management Service and the virtualization suite endpoints. The adapter will implement the route on the fly. In embodiments, the transaction service will monitor the message exchange for signs of success or failure and the scripting service generates the individual messages to be delivered. All messages may be persisted to OpenTSDB, guaranteeing full granularity forever. Camel's domain specific language greatly simplifies the task of building message routes dynamically when a user creates a new asset.

Provisioning Scripting Service

Most provisioning policies are worded as negative prohibitions (e.g., "no application will run as root"). These provisioning policies, as well as positively worded ones (e.g., "content management servers will serve static content from static web servers whenever possible"), need to be re-interpreted into explicit affirmative provisioning tasks. In embodiments, the provisioning scripting service assembles default templates for common tasks (e.g., creating a VM on Amazon). The provisioning scripting service then replaces default tasks with policy-compliant tasks. An important concept to grasp is that a substitution may require additional, dependent tasks, as well as modifications and deletions to the default task list. For instance, a prohibition against installing an application as root involves the addition of dependent prerequisite tasks such as creating a non-root account and setting its permissions in directories accessed during the installation procedure. As an example modification, changing default usernames, passwords or ports will cause modifications to many instructions in many steps that require these values. Furthermore, many post conditions are also required, especially where remote connections are involved. Many networking steps execute without apparent error, but the networked features subsequently fail when tested.

The shortest path between dependent tasks is called the "critical path." From a business perspective, the critical path is important because it can be used to determine the shortest duration possible for project completion. Other non-dependent tasks can (and probably should) be completed in parallel threads of execution. However, any delay in a task that is part of the critical path results in a delay of equal duration in the project.

In embodiments of the system and method, the critical path is important not because of its time predictive qualities, but because it embodies the critical configuration management intricacies of a provisioning effort. Embodiments of the system and method model dependencies in RDF using transitive properties. Embodiments of the provisioning scripting service compute the critical path using "chaining," a feature of SPARQL 2.0 that allows queries to include degree-of-separation predicates. Having computed the critical path, the provisioning scripting service can incorporate validation control points that are monitored by the transaction service. Employing this technology results in a high probability of success without human interaction in substituting default provisioning tasks with policy-conforming tasks.

The provisioning scripting service may construct provisioning scripts in a domain specific language (DSL) unique to embodiments described herein. The DSL is declarative and platform-agnostic in nature. The provisioning scripting service then may use the open source ANTLR framework to translate the DSL instructions into vendor-specific virtualization management instructions (e.g., VMware). The provisioning scripting service may then marshal these instructions into sequential messages to be routed by the virtualization adapter to the vendor-specific virtualization management suite. Embodiments of the provisioning scripting service support Chef and Puppet grammars, but additional grammars are possible.

WSMO Endpoint

With continued reference to FIG. 8, embodiments use a Web Service Model Ontology (WSMO) endpoint to describe web service behavior semantically. The WSMO specification is a declarative, RDF-based specification for describing web service behavior semantically. The WSMO endpoint includes four major components: ontology, bindings, goals, and mediator. Because it is RDF, it can be browsed or queried via SPARQL. Embodiments may use the open source WSMO-Lite implementation, which is written in Java and deploys to standard JEE application servers. Embodiments use the WSMO endpoint to describe decision service behavior to the monitoring service and the management service. For each system asset, the monitoring service can query the WSMO Endpoint to discover what business rules apply to the asset, and whether the asset is currently in compliance. If the asset is not in compliance for a particular rule, the management service can query the WSMO Endpoint to discover what corrective action workflows are defined for that particular rule. Therefore the WSMO Endpoint declaratively defines and encapsulates all autonomic business logic in a single place, instead of being distributed in procedural code across several components.

WSMO goals include semantic descriptions of both functional and non-functional behavior. Non-functional behavior includes concepts such as service level guarantees and price. Functional behavior describes the purpose of the service. The service also includes both preconditions (prerequisites) for using the service, and post conditions (system state changes caused by using the service). The ability to describe pre- and post-conditions allows the management service to choreograph service executions in the proper order, and allows the management service to act as a finite state machine, without containing any business logic. WSMO functional behavior semantics also support differences in cardinality, and can therefore be used to dynamically implement nested loops or parallel execution threads. This is an important feature, because most management algorithms are naturally implemented as either nested loops or parallel threads.

Embodiments use WSMO to construct nested loops. The WSMO may include eight methods that the management service dynamically orders into nested loops. The pseudo code signatures of these methods are as follows:

```
List<URI> getAssetTypes(URI customer)
List<URI> getPreAggregatedRules(URI assetType)
List<URI> getAggregatedRules(URI assetType)
List<URI> getIndividuals(URI assetType)
List<URI> getIndividualRules(URI asset)
List<URI> getThresholds(URI asset, URI rule)
List<URI> getMetrics(URI asset, URI rule)
String getDecisionServiceSyntax(List parameters, URI rule)
```

These web services contain SPARQL queries (against the ontology), OpenTSDB API calls (against HBase), and OpenRules API calls (against OpenRules), to retrieve information about asset types, individual assets, rules, metrics and thresholds. Encapsulating the data access logic inside the WSMO web services allows the management service to focus on workflow API interaction rather than query syntax.

In an embodiment, pre-and-post-condition functional descriptions in the WSMO semantics cause the management service to function as a finite state machine, and to choreograph the web service executions in the following order:

The management service invokes the getAssetTypes service. This returns a list of asset types (e.g., hosts, virtual machines, databases, etc.). The management service creates an outer loop, with one iteration per asset type.

For each asset type, the management service invokes the getPreAggregatedRules service. The getPreAggregatedRules service will query the ontology to find the rule signature for each rule that evaluates a pre-aggregated OpenTSDB metric. Certain simple aggregations are done automatically and continuously by OpenTSDB, making the retrieval of these precalculated values from HBase extremely efficient. The management service then invokes the decision service (using a helper method to arrange the rule in the proper decision service syntax). If the pre-aggregated metric is not within compliance, the management service can kick off either a normal or else an escalated remedial workflow.

For each asset type, the management service invokes the getAggregatedRules service. The getPreAggregatedRules service will query the ontology to find the rule signature for each rule that evaluates metrics that are aggregated according to some formula by OpenRules. Aggregation through OpenRules allows for far more complex aggregate rule definition than OpenTSDB. The management service then invokes the decision service (using a helper method to arrange the rule in the proper decision service syntax). If the aggregated metric is not within compliance, the management service can kick off either a normal or else an escalated remedial workflow.

Now that the pre-aggregated and aggregated rules have been evaluated, the management service creates a nested inner loop under each asset type, by invoking the getIndividuals service. The management service then creates one iteration per individual asset of that type. For instance, the management service will execute once per host, or once per virtual machine.

In each iteration, the management service calls the getRules service. The getRules service will return the rule signatures that apply to the individual asset. The management service now creates a nested inner loop, with one iteration per rule.

In each iteration, the management service calls the getThresholds service to receive the thresholds that apply to that individual for that particular rule. The management service also calls the getMetrics service to get the current values for these metrics.

The management service then calls the decision service to pass the threshold and metrics values for evaluation. If the individual asset is not in compliance, the management service can launch either a regular or an escalated remediation workflow.

It should be noted that a rule might contain thresholds from more than one asset type. For instance, a rule may constrain the number of virtual machines deployed on a single host. Such a rule would be evaluated during the "host" loop if it is categorized in the ontology as a host-related rule. It would not be re-evaluated during each virtual machine iteration. Later sprints will focus on replacing nested loops with parallel execution threads.

Reporting Service

With continued reference to FIG. 8, embodiments contain a reporting service. Hierarchical dimensional modeling ("pivot table analysis") of both semantic and metric data is provided by leveraging the RDF Data Cube specification, which provides an RDF grammar for defining data tables, rollup tables, and OLAP cubes. The reporting service will provide a user-friendly visual environment for defining the cubes. Aggregate statistical analysis of RDF data is supported through the open source statistical language R. Thin client (browser) GUI support for R is available through R Studio's "Shiny" package. R also provides excellent support for time series analysis, which can be performed directly against OpenTSDB or rolled into a Data Cube for drill-down and pivoting. Embodiments may include a custom GUI or may leverage Pentaho, an open source business intelligence suite. The three primary anticipated uses of the reporting service are to demonstrate compliance with current policies; to perform impact analysis on potential changes in policies; and to compute decision yield. Decision yield is an Enterprise Decision Management concept that evaluates business rule effectiveness along five axes: cost, speed, agility, accuracy and consistency.

Notification Service

Embodiments include a general purpose notification service. The past few years have clearly demonstrated that event driven architectures thrive in both public and private clouds. The publish-subscribe notification paradigm is far more agile than point-to-point solutions. The notification service also helps achieve higher levels of business logic encapsulation, robustness and scalability than point-to-point messaging systems. Embodiments of the notification service is implemented with Camel, and open source ESB solution written in Java (and also described in the Virtualization Management Adapter section). Camel works with a large number of message formats and protocols, and has a lot of out-of-the-box components that are easily deployed to JEE components of all types. Camel is Maven-based, and therefore easily added to any Maven-managed build process.

The WSMO Endpoint greatly enhances the publish-subscribe capabilities of the notification service because it can semantically describe the goals and the behaviors of notification queues.

Content Management Service

Embodiments offer an immense and unprecedentedly rich semantic knowledge base that contains both high level and abstract concepts, such as strategies; as well as low level and constantly changing concepts, such as thresholds. However, in spite of its semantic expressivity, users will always require a higher level of detail and complexity that can only achieved through discourse. Embodiments provide a mechanism for associating text documents with ontological concepts. Embodiments use the open source NeOn Toolkit utility Cicero, which is a Wiki environment that allows an unlimited amount of text documentation to surround any concept in the ontology. This allows all content to be semantically "pegged" to the system ontology. Example uses for Cicero include user manuals; context-sensitive help; full-length reports (containing abstract, procedure, analysis, and conclusions sections); support ticket and change management documents; blogs; policy guidance; and many more. Custom R packages developed to perform custom analyses can also be linked through Cicero, so that a multidisciplinary population can read the documentation without needing to know how to use R. The Jenkins continuous integration system, which is extremely popular with Java developers working on Agile projects, integrates easily with Cicero.

Security Service

Embodiments provide a federated security model that is designed to provide customers with access to multiple public and private cloud environments. In keeping with current federated security concepts, the security service decomposes into an identity service, a trust service, an audit service, policy decision points, and policy enforcement points. These services interact to provide a single-sign-on experience. Policy enforcement points are implemented by software vendors (e.g., container-managed security in JEE).

The typical authentication and authorization process proceeds as follows: the identity service creates a mechanism by which the client may authenticate against a local credential store. The identity service then forwards the authentication token to the trust service, which determines whether the certification authority is within its list of trusted certificate authorities. If trusted, the identification service then forwards its trust token to the policy enforcement point of the desired resource. The policy enforcement point then makes an attribute-based authorization request to the policy decision point. Embodiments use Attribute Based Access Control (ABAC) because it is more agile and scales better than Role Based Access Control (RBAC).

Embodiments also secure ontological concepts by graph name. This feature allows customers (and the system itself) to create public and private ontologies. The Virtuoso SPARQL endpoint will intercept queries and compare named graphs to ABAC policies. ABAC can also be refined further to constrict named graphs to subsets of people or assets within a customer's organization.

Figure 9:
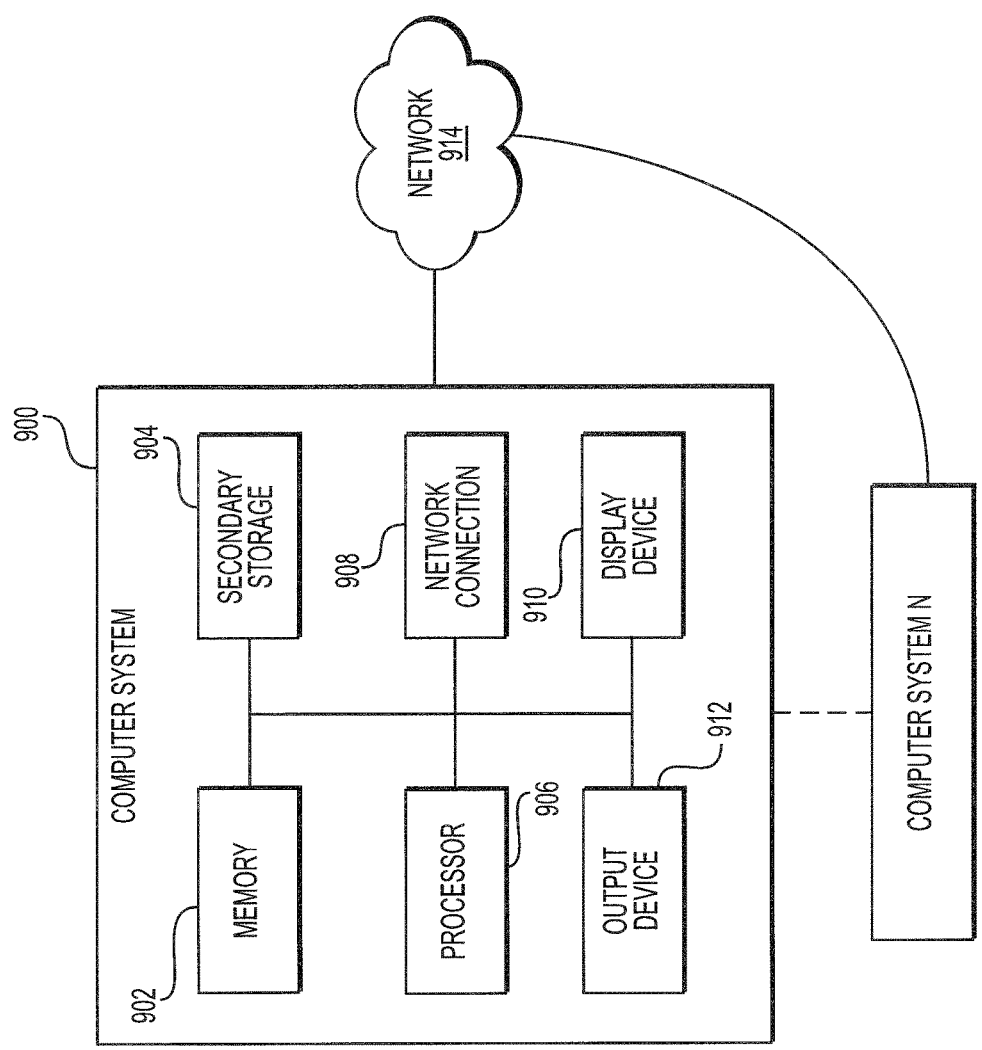
FIG. 9 is a block diagram illustrating exemplary hardware used to implement an embodiment of a system and method for policy-driven assessment and action taking on massive amounts of dynamically changing data.

With reference now to FIG. 9, shown is a block diagram of exemplary hardware that may be used to implement embodiments of a system and method for policy-driven assessment and action taking on massive amounts of dynamically changing data. As noted above with reference to FIG. 1, system functionality may be implemented as one or more computer programs, e.g., daemons, that harvest source data items, monitor for changes in specified attributes, evaluate the changes against declarative logic encapsulated in business rules that use semantic ontologies to encapsulate monitored metrics. Likewise, the system services 800 may be implemented as modules in such computer programs or simply as a computer program. Additionally, such system services 800 may be instantiated within various servers, frameworks and databases as described above with reference to FIG. 8. Computer systems such as computer system 900 may store and execute such computer programs, modules, system services, servers, frameworks and database to embodiments of a system and method for policy-driven assessment and action taking on massive amounts of dynamically changing data.

Computer system 900 may be a server or series of servers, such as in a bladed server system. Computer system 900 may be replicated in embodiments. Embodiments may include various other computer systems 900 similarly configured, may include and execute one or more subsystem components to perform functions described herein. Computer system 900 may connect with network 914, e.g., Internet, or other network, to e.g., monitor and harvest data sources, connect with user terminals or other computer systems for inputting changes to business rules and ontologies, etc.

Computer system 900 typically includes a memory 902, a secondary storage device 904, and a processor 906. Computer system 900 may also include a plurality of processors 906 and be configured as a plurality of, e.g., bladed servers, or other known server configurations. Computer system 900 may also include an input device (not shown), a display device 910, and an output device 912. Memory 902 may include RAM or similar types of memory, and it may store one or more applications for execution by processor 906. Secondary storage device 904 may include a hard disk drive, floppy disk drive, CD-ROM drive, or other types of non-volatile data storage.

Processor 906 executes the computer programs which are stored in memory 902 or secondary storage 904, or received from the Internet or other network 914. The processing by processor 906 may be implemented in software, such as software modules, for execution by computers or other machines. These computer programs preferably include instructions executable to perform the system functions and methods described above and illustrated in the FIGS. herein. The applications preferably provide graphical user interfaces (GUIs) through which users may view and interact with the system.

Computer system 900 may store one or more database structures in secondary storage 904, for example, for storing and maintaining semantic databases described above, and other information necessary to perform the above-described methods. Alternatively, such databases may be in storage devices separate from computer system 900.

Also, as noted, processor 906 may execute one or more computer programs in order to provide the functions described in this specification. Such methods and the processing may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the system 900.

Input device may include any device for entering information into computer system 900, such as a touch-screen, keyboard, mouse, cursor-control device, touch-screen, microphone, digital camera, video recorder or camcorder. The input device 408 may be used to enter information into GUIs during performance of the methods described above. Display device 910 may include any type of device for presenting visual information such as, for example, a computer monitor or flat-screen display (or mobile device screen). Output device 912 may include any other type of device for presenting output.

Examples of computer system 900 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 900 is shown in detail, system implementations may use multiple computer system or servers as necessary or desired to support the users and may also use back-up or redundant servers to prevent network downtime in the event of a failure of a particular server. In addition, although computer system 906 is depicted with various components, one skilled in the art will appreciate that the server can contain additional or different components. In addition, although aspects of an implementation consistent with the above are described as being stored in memory, one skilled in the art will appreciate that these aspects can also be stored on or read from other types of computer program products or computer-readable media, such as secondary storage devices. The computer-readable media may include instructions for controlling a computer system, computer system 900, to perform a particular method, such as methods described above.

Figure 10:
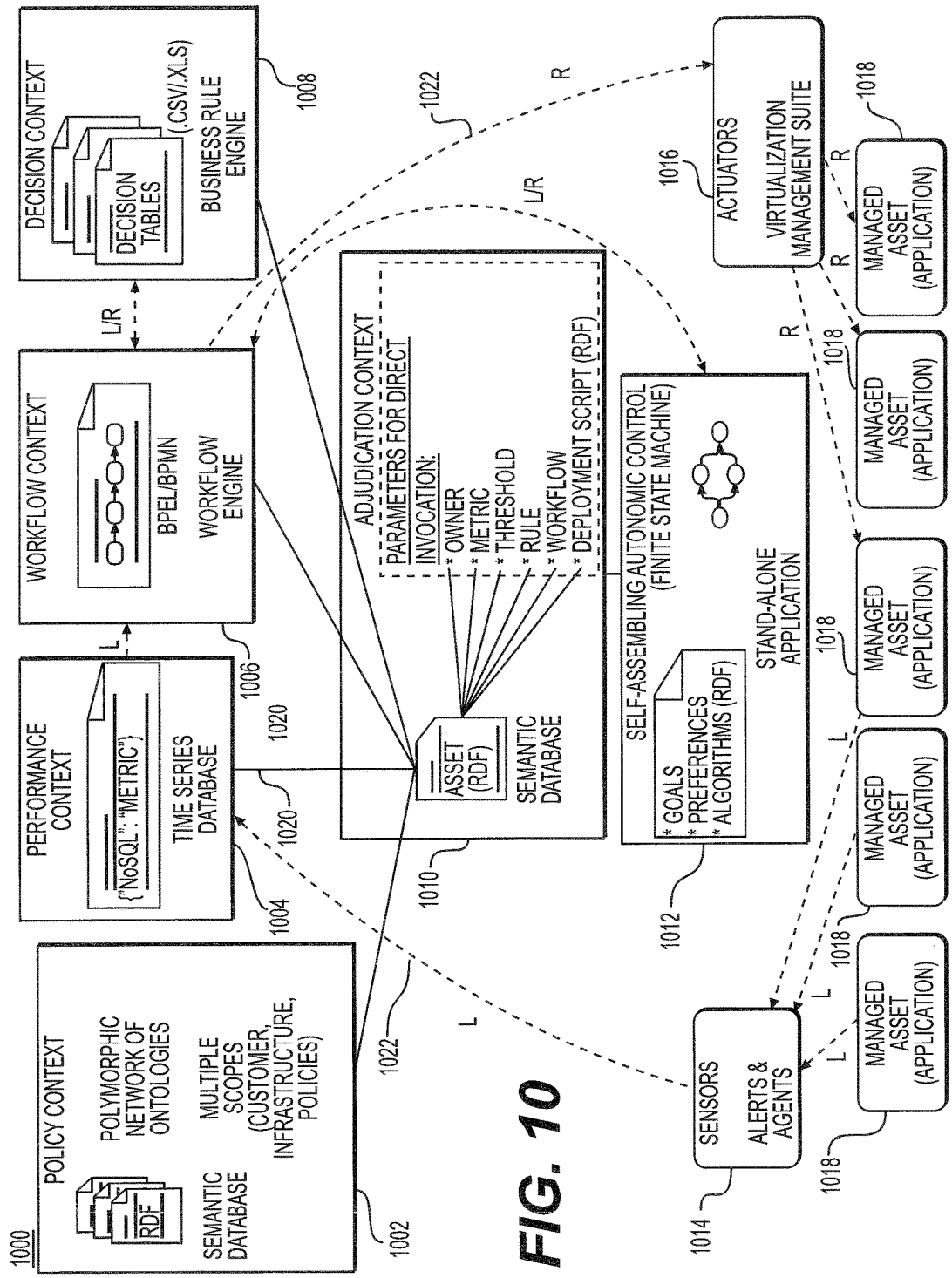
FIG. 10 is a block diagram illustrating an embodiment of a system for policy-driven assessment and action taking on massive amounts of dynamically changing data.

With reference now to FIG. 10, shown is an embodiment of system 1000 for providing a scalable semantic mechanism for policy-driven assessment and action taking on dynamically changing data. FIG. 10 illustrates an exemplary implementation a system for providing a scalable semantic mechanism for policy-driven assessment and action taking on dynamically changing data. The implementation shown may be utilized by a small, medium or large enterprise or other organization to manage a variety of assets across the entire enterprise, in, e.g., a single geographic location or a variety of widely separated geographic locations. System 1000 components correspond to the system 100 illustrated in FIG. 1, as described below.

A novel feature of embodiments of system 1000 described herein is that system 1000 provides four contexts 1002-1008 linked by an adjudication context 1010 for assessment and action taking on an enterprises' managed assets 1018. These four contexts 1002-1008 linked by an adjudication context 1010 replace an application context for enterprise-scale autonomic computing. By replacing the application context, system 1000 is fully scalable and capable of handling any size enterprise with any number of managed assets 1018. No known system replaces the application context with four contexts linked by an adjudication context. No known system is fully scalable to provide policy-driven assessment and action taking on dynamically changing data.

System 1000 is a policy-based complex orientation, decision making and analysis system. Embodiments of system 1000 provide a solution for asserting autonomic control over an enterprise computing environment in accordance with policy. System 1000 achieves unmatched scalability, speed and transparency by creating and managing associations between declarative contexts and function-based programming. Declarative programming is a programming paradigm, a style of building the structure and elements of computer programs that expresses the logic of a computation without describing its control flow. System 1000 divides an enterprise, or other logical association, into four declarative contexts 1002-1008 and defines relationships between the four declarative contexts 1002-1008 with a fifth declarative context 1010. Using four declarative contexts 1002-1008 and mapping associations between them with fifth declarative context 1010 eliminates the need to construct a single application context over all of the assets 1018 in an enterprise in order to control them. All other control solutions, such as SOA and EDA, require the construction of an over-arching and usually inflexible application context in order to achieve feedback and assert control over the environment. The burden of constructing a single over-arching application context is the reason why no other solution can achieve the speed, scale, or transparency of embodiments described herein.

With continuing reference to FIG. 10, system 1000 include four contexts: policy context 1002, performance context 1004, workflow context 1006 and decision context 1008. The context that manages the associations of these four contexts is adjudication context 1010. Because all system 1000 contexts are declarative, any application in an enterprise utilizing system 1000 can query all of the contexts instantaneously from within its own application context to receive feedback and control instructions. This is not possible with any other solution.

In computer science, a context is the minimum set of data that is necessary to allow a processor to function as intended, after a (hypothetical) interruption. In the present application, policy context 1002 is the data necessary for system 1000 to process policy directives and constraints. Similarly, workflow context 1006 is the data necessary for system 1000 to construct and iterate over finite state pathways. Decision context 1008 is the data necessary for the business rule engine to understand and execute decisions with supplied data. Performance context 1004 is the data necessary for system 1000 to understand observations of performance metrics of managed assets 1018. Adjudication context 1010 is the data necessary to understand the relationship between policies, managed assets, owners, thresholds, metrics and rules, so that compliance with policy can be demonstrated for every component in system 1000, and so that the affect of every policy can be traced to every component in system 1000.

Policy context 1002 is a polymorphic network or collection of ontologies managed in a semantic database. The ontologies in policy context 1002 correspond to ontologies 108 of system 100 illustrated in FIG. 1. Accordingly, policy context 1002 corresponds to the orientation portion of system 100 shown in FIG. 1. Ontologies of policy context 1002 may capture thresholds for sensor 1014 readings from managed assets 1018. In system 1000, governance policies of an enterprise are expressed in a semantic, declarative grammar. The expression of governance policies in a semantic, declarative grammar allows the policy context 1002 of an enterprise to be infinitely polymorphic, hierarchical, associative and agile. Here, polymorphic means that a real-world item can represent one concept under one policy in policy context 1002, and simultaneously represent another concept under another policy in policy context 1002. Policy context 1002 is hierarchical in the sense that any concept can be sub-classed or super-classed. Policy context 1002 is associative, meaning that any arbitrary relationship can be expressed with a single statement. Policy context 1002 is agile in the sense that a user can change policy context 1002 by adding or deleting a single statement, without needing to impose metadata or schema statements or write complex software code.

The execution environment of policy context 1002 is a semantic database. Policy context 1002 is persisted (stored) in a semantic database. The semantic database may be run by and located on, e.g., a server or plurality of services, such a servers supporting or providing a cloud environment. Co-tenant isolation in a cloud environment may be established by constructing different named graphs for each tenant enterprise. Therefore, no enterprise can query another enterprise's policies, even though they share the same cloud infrastructure. In an embodiment, policy context 1002 is modeled in RDF (a declarative grammar), may be queried with SPARQL (a declarative query language) and is persisted in a Virtuoso universal database.

With continuing reference to FIG. 10, performance context 1004 receives and contains information on events and metrics observed by the environment, e.g., sensors 1014 monitoring an enterprise's managed assets 1018. Performance context 1004 corresponds to orientation portion of system 100 in FIG. 1. Performance context 1004 receives and stores the output of sensors 1014. Events represent instantaneous transitions between discrete states of managed asset 1018. Metrics represent continuous transitions in state of managed assets 1018. Performance context 1004 uses declarative and schema-less grammars to define events and metrics and their sources (both asset 1018 and owner).

The execution environment of performance context 1004 is a time-series database. Performance context 1004 is persisted (stored) in a time-series database. When receiving events and metrics, performance context 1004 time-stamps the events and metrics in addition to defining them and identifying their source assets 1018. An embodiment may use HBASE, which is a column-family database running on Hadoop, to implement performance context 1004. However, any NoSQL column-oriented or document-oriented database suffices. Performance context 1004 supports aggregation on an infinite number of dimensions (time, owner organization (infinitely hierarchical), asset (infinitely hierarchical), and metric type (infinitely hierarchical). The time-series database of performance context 1004 may be run by and located on, e.g., a server or plurality of services, such a servers supporting or providing a cloud environment. Like the other contexts, co-tenant enterprises' performance contexts 1004 are isolated by named graphs. As such, it is not possible for one co-tenant to query another co-tenant's events or metrics, even though such co-tenants may share the same infrastructure.

With continuing reference to FIG. 10, workflow context 1006 contains information about how system changes should be carried out. Workflow context 1006 corresponds to the action portion of system 100 illustrated in FIG. 1. Workflow context 1006 determines and directs the workflow process necessary to manage a non-compliant managed asset 1018 back into compliance with enterprise policies. Specifically, workflow context 1006 instructs actuators 1016 to make changes to managed assets 1018 and their settings to bring managed assets 1018 back into compliance. The execution environment of workflow context 1006 is a workflow engine. Workflow context 1006 may be implemented using any workflow engine that supports a declarative workflow definition language. In an embodiment, workflow context 1006 is implemented using ePower, which is BPEL-compliant.

Most workflow engines support micro-processes (fast automated finite state machine executions that can be "rolled-back" if unsuccessful); macro-processes (long finitestate-machine processes that cannot be "rolled back" if unsuccessful); and human tasks. Most workflow engines support some level of workload management (how to assign new tasks based upon each actor's current work load); escalation (how to respond differently if previous attempts failed); and compensation (how to rectify a problem that happened in a macro-process or human process). Existing workflow engines have limited flexibility with regard to micro, macro, human, workload and escalation options. Embodiments of workflow context 1006 supports an infinite number of options for all of these features. Workflow context 1006 allows these options to be queried easily and defined dynamically as a consequence of runtime events. Workflow engines and, therefore, workflow context 1006, may be run by and located on, e.g., a server or plurality of services, such a servers supporting or providing a cloud environment. As with all the other contexts, in embodiments co-tenants are isolated from each other via named graphs.

With continuing reference to FIG. 10, decision context 1008 contains business rules, encoded in a declarative grammar. Business rules correspond to business rules 116 of system 100 shown in FIG. 1. Decision context 1008 corresponds to decision portion of system 100 in FIG. 10. In an embodiment, decision context 1008 may be implemented using decision tables. Other embodiments may be implanted using RuleML. Business rules define conditions under which something must be started, stopped or assigned a specific value.

The execution environment of decision context 1008 is a business rule engine. Most organizations choose to execute business rules within a rule engine. Rule engines are designed to guarantee consistency (i.e., rule engines generate the identical decision under identical conditions) and speed (i.e., rule engines consider only the minimal number of conditions to reach the right conclusion). To achieve these guarantees, rule engines sacrifice flexibility (the ability to provide different thresholds or criteria at runtime). Embodiments may use any JSR 184-certified-compliant rule engine and guarantee consistency and speed even though providing semantically-encoded thresholds and criteria at runtime. An embodiment of decision context 1008 was implemented with OpenRules, a JSR-184-compliant rule engine. Rule engine and, therefore, decision context 1008, may be run by and located on, e.g., a server or plurality of services, such a servers supporting or providing a cloud environment. As with all the other contexts, in embodiments co-tenants are isolated from each other via named graphs; therefore, no co-tenant can browse another co-tenant's rules.

With continuing reference to FIG. 10, adjudication context 1010 is the context that defines all associations between the policy context 1002, performance context 1004, workflow context 1006 and decision context 1008 that are necessary to monitor and manage the enterprise computing environment. Adjudication context 1010 is semantic and declarative. Each adjudication context is an RDF Individual that encapsulates mappings between a managed asset 1018 and the managed asset's 1018 associated metrics (read from sensors 1014 and stored in performance context 1004), thresholds (contained in ontologies in policy context 1002), rules (business rules contained in decision context 1008), actions (taken by actuators 1016 in response to decision context 1008 decision and owners (of managed assets 1018). An adjudication context 1010 may exist for an individual asset 1018 or may be defined through an infinite number of hierarchical adjudication profiles. Adjudication context 1010 encapsulates a potentially infinitely complex object graph of associations between a managed asset 1018 and the four contexts 1002-1008, and yet can be queried and retrieved from any application in a single query statement. An adjudication context 1010 must be created by an authorized Adjudicator (which can be a human or a machine).

The execution environment of adjudication context 1010 is a semantic database. Adjudication context 1010 is persisted in a semantic database and may be run by and located on, e.g., a server or plurality of services, such a servers supporting or providing a cloud environment. In an embodiment, as with all of the other contexts, co-tenants are isolated from each other via named graphs. No co-tenant can browse another co-tenant's adjudication context 1010. Adjudication context 1010 may be defined in an RDF ontology and browsed using SPARQL. Adjudication context 1010 may be created, modified or removed in managed transactions (all parts of the graph must be created or deleted). In an embodiment, adjudication context 1010 was wrapped in managed transactions using the Java Transactions API and executed within common JEE EJB Containers. Embodiments, however, may be implemented with any declarative transaction management technology.

Adjudication context 1010 provides transparency and demonstrable compliance with policy. It is the role of the Adjudicator that guarantees nonrepudiation. The solution guarantees that a single query can always determine that a certain Adjudicator made an Adjudication that connected certain Policies, Rules, and Thresholds with certain Assets. A single query can always confirm that any Action taken was in furtherance of an Adjudicated policy.

With continuing reference to FIG. 10, a finite state machine, namely self-assembling autonomic control system 1012, operates on and executes adjudication context 1010 and four contexts, policy context 1002, performance context 1004, workflow context 1006 and decision context 1008 linked by adjudication context 1010. Self-assembling autonomic control system 1012 may be a stand-alone application that contain goals, preferences and algorithms to operate complex orientation, decision making and analysis system 1000. Self-assembling autonomic control system 1012 is declarative which enables any system component to discover in a single query how it was monitored (how often; in what order; by what resources; and how monitoring would be effected by scaling).

The operation of system 1000 may be understood with reference to FIG. 10. FIG. 10 illustrates left ("L") and right ("R") side interfaces of system 1000. These interfaces 102 and 122 of system 100 in FIG. 1. Dashed lines in FIG. 10 illustrate direct interface invocation (e.g., Conventional Protocols/APIs). Solid lines in FIG. 10 illustrate queries (e.g., SPARQL/Xquery). An OODA loop, as described above, is shown as follows: observe—dashed lines representing direct interface invocations to sensors 1014 from performance context 1004; orient—solid lines representing queries between self-assembling control system 1012 and adjudication context 1010 and between adjudication context 1010 and four contexts 1002-1008; decide—dashed lines representing queries between performance context 1004, workflow context 1006, decision context 1008 and between self-assembling control system 1012 and workflow context 1006; and act—dashed lines representing queries between self-assembling control system 1012 and workflow context 1006 and workflow context and actuators 1016.

In operation, policy context 1002 ontologies set forth the monitoring requirements for an enterprise (organization) and are based on the enterprises' policies and other enterprise user input. Sensors 1014 monitor and output the events and metrics of the enterprises' managed assets 1018, which may be identified in the policy context 1002. Managed assets 1018 may be people and objects; in an IT context, managed assets may be, for example, servers, networks, firewalls, configuration items, databases, virtual machines, deployed applications, startup scripts, etc. In other words, anything that an enterprise would consider an asset that has some kind of IT representation. Assets 1018 may be applications that each executes in its own application context. In other implementations, managed assets 1018 may be any device, system, room, machine, etc. an enterprise would consider an asset that can be monitored. Combinations of IT and non-IT assets 1018 may be managed as well.

Output from sensors 1014 is received, time-stamped and persisted by and in performance context 1004. Workflow context 1006 check events and metrics and feeds those values to the business rule engine of decision context 1008. Decision context 1008 processes the output with business rules to determine if events and metrics meet or are compliant with required levels or settings. If a managed assets events and/or metrics do not meet or are not compliant with required levels or settings, workflow context 1006 sends appropriate instructions to actuator(s) 1016 to make necessary changes to affected managed assets 1018 settings. Actuators 1016 correspond to external control points 126 of system 100 in FIG. 1. Actuators 1016, in an IT setting, may be a virtualization management suite. As part of real-time CODA loop, system 1000 may process updated sensor 1014 readings of affected managed assets 1018 and may determine whether events and metrics read are compliant or non-compliant and whether further adjustments need to be made by actuators 1016. Adjudication context 1010 manages and orients the above process by querying policy context 1002, performance context 1004, workflow context 1006 and decision context 1008 to determine that correct assets were observed, data was obtained, decisions were made and actions are taken consistent with policies and business rules of the enterprise.

Figure 11:
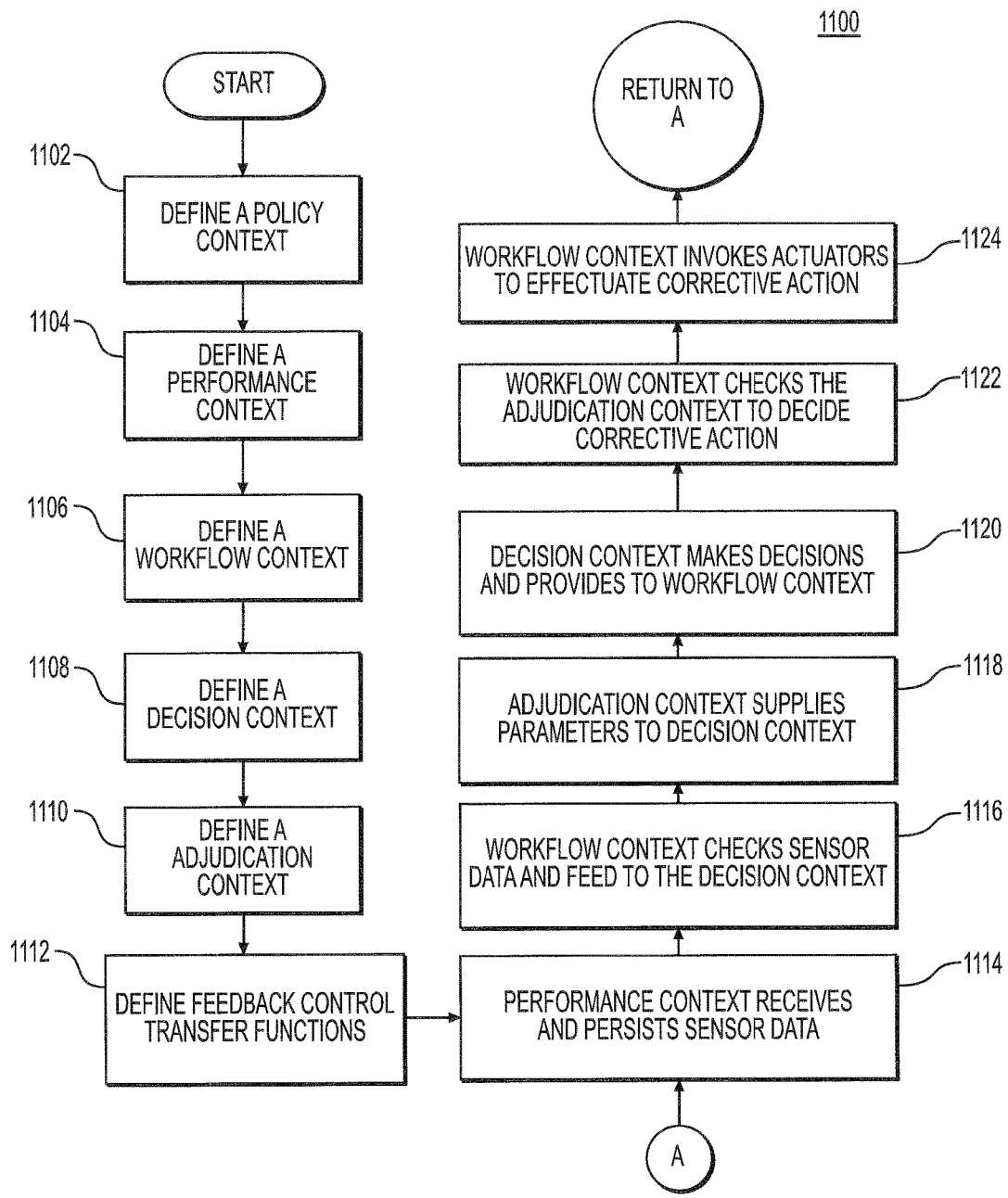
FIG. 11 is a flowchart illustrating an embodiment of a method for policy-driven assessment and action taking on massive amounts of dynamically changing data.

With reference now to FIG. 11, shown is a flowchart illustrating an embodiment of method 1100 for providing a scalable semantic mechanism for policy-driven assessment and action taking on dynamically changing data. Method 1100 defines a policy context for an enterprise, block 1102. The policy context may be defined based on user inputs and policy document of an enterprise received by the system. Defining 1102 the policy context includes creating the ontologies described above. In embodiments described herein, defining 1102 a policy context includes serializing the policy context in a declarative grammar and deploying the policy context in a queryable environment (semantic database) Note, some implementations may include a set of pre-defined or default policies implemented in a default or public policy context. An enterprise may adopt this default or public policy and may add to it or replace it with its enterprise policy context.

Method 1100 may define a performance context for the enterprise, block 1104. Defining 1104 the performance context for the enterprise may be based on user input, the policy context, an identification of the managed assets of the enterprise, and the managed assets that must be managed per the policy context. In embodiments described herein, defining 1104 a performance context includes serializing the performance context in a declarative grammar and deploying the performance context in a queryable environment (e.g., time-series database).

With continuing reference to FIG. 11, method 1100 may define a workflow context for the enterprise, block 1106. Defining the workflow context may be based on user input of actuators available to adjust setting on managed assets, known information regarding operation of such actuators, and the settings of managed assets. In embodiments described herein, defining 1106 a workflow context includes serializing the workflow context in a declarative grammar and deploying the workflow context in a queryable environment (e.g., workflow engine).

Method 1100 may define a decision context for the enterprise, block 1108. Defining 1108 a decision context for the enterprise may include setting thresholds, acceptable levels, etc. and otherwise defining or receiving business rules for the enterprise. In embodiments described herein, defining 1108 a decision context includes serializing the decision context in a declarative grammar and deploying the decision context in a queryable environment (e.g., business rules engine).

With continuing reference to FIG. 11, method 1100 may define an adjudication context for the enterprise, block 1110. Defining 1110 adjudication context maps each managed asset to its parameters, e.g., owner IDs, Parameter IDs, Metric IDs, Threshold IDs, Rule IDs and Workflow IDs. In this manner, adjudication context links the other four contexts, as described above. In embodiments described herein, defining 1110 adjudication context includes serializing adjudication context in a declarative grammar and deploying the adjudication context in a queryable environment (e.g., semantic database).

Method 1100 may also define a feedback control transfer functions for the enterprise, block 1112, setting up the finite state machine. The feedback control transfer functions are the functions executed, e.g., by the finite state machine to effectuate the OODA loop described herein. These feedback transfer functions may also be serialized in a declarative grammar and deployed in a queryable environment. The finite state machine queries goals and preferences to create the preferred type of control transfer function (the "loop" in the OODA Loop). Finite state machine may dynamically generate its own code to form the upper or outer loop. That outer loop kicks off workflow instances. Finite state machine, however, uses adjudication context to populate all of the parameters in the workflows of workflow context.

In operation, sensor data, events and metrics, is received and persisted in performance context per enterprise policies set forth in policy context, block 1114. Workflows of workflow context check events and metrics and feed those values to the business rule engine of decision context, block 1116. Adjudication context supplies the parameters that the business rule engine needs to make decision of whether action needs to be taken (e.g., compliance or non-compliance), block 1118. Business rule engine of decision context makes decisions and gives them back to workflows of workflow context, block 1120. Workflow context checks the adjudication context again to decide which corrective action workflow to apply (which may or may not be escalated), block 1122, and to populate the parameters that the corrective workflow instance needs. The corrective workflow invokes one or more actuators to effectuate corrective action, block 1124. Workflow context queries the adjudication context in order to provide whatever parameters the actuator needs. Method 1100 may repeat on dynamic basis while corrective action is still needed.

In embodiments, workflow context also write some metrics in the time series database of performance context, so that system and system users can always query not only what is wrong in the system, but how much time and effort is spent trying to fix it. Some of the "priority" policies are based on knowing how much time and effort is spent doing things, so inserting metrics that relate to workflow metrics allows system to easily calculate aggregate statistics of this type.

No other solution divides an enterprise into four contexts defines the four contexts declaratively and defines all associations between the contexts declaratively. No other solution conceives of the concepts of Adjudicator and Adjudication to define those associations. No other solution guarantees that every component in the system can query all four contexts without the computational latency and cost of creating an application context. No other system guarantees the capacity for users to create infinite levels of divisions between assets, organizations, polices, rules, thresholds and metrics. No other solution uses named graphs to guarantee that it can completely isolate co-tenants in a cloud architecture without duplication of its database, metrics, workflow or decision-making computational assets. If even one context relied upon a non-declarative (procedural) solution, none of these guarantees would be possible.

Embodiments described herein intercept and rewrite queries to include named graph identification specific to the enterprise. Query rewriting is a policy enforcement point in a Federated Security model embodiment. It should be noted that this is similar to the technique that Oracle uses for its Oracle Label-Based Security (OLS), which prevents any application in the middleware tier from accessing unauthorized data from the relational database tier. However, this technique has never been applied to semantic databases using named graphs, instead of relational table definitions. The advantage of this approach is agility; users can create infinitely complex roles and responsibilities in a semantic database, and do so at runtime. OLS can only support four-dimensional constraints, however, and must be managed by a database administrator between software rollouts.

What was needed was a system that could schedule and drive all monitoring functions in some reasonable fashion, and describe that fashion in response to a query. What was developed and described herein is a declarative solution for describing or prescribing transfer functions (sequential, parallel, negative, or PID feedback loops) based upon a declaration of goals and a declaration of algorithm preferences. Embodiments of the system can self-assemble a finite state machine to achieve these purposes, by scheduling and driving other workflows. Embodiments of the system are defined in RDF, and can generate feedback system algorithms in any functional language (e.g., Node.js, which is server-side JavaScript). Functional languages, as opposed to procedural languages, can pass functions (algorithms) as objects. Functional languages have the advantage of being able to pass algorithms across application contexts. Therefore a SPARQL query can generate a feedback loop or an event-triggered callback function.

The following describes an exemplary control flow during a typical use case.

Introduction of a New Policy Document

The enterprise decides that a policy document has become relevant to the enterprise. The enterprise may have created the document itself, or it may have been created outside the enterprise, for example by a standards body.

Ontologization of the Document

Users with the role of "ontological engineer" deconstruct the document into RDF instances of the Concept class, which is a super-class in the CO&DA ontology. Users can aggregate, subordinate, or otherwise associate the concepts with other concepts. CO&DA supports unlimited semantic associations using Linked Open Data principles.

Adjudication of the Policies

Users with the role of "adjudicator" review the concepts that represent requirements, duties or constraints. They identify the assets that need to be managed. They define the corresponding rules, thresholds and metrics that would best represent compliance with policy for those assets. Users (or a machine) with the role of "business process engineer" define the sourcing workflows and actuator workflows that are necessary to review compliance and establish compliance, respectively. The workflows include definitions for participants, roles, messages, reports, forms, document handling, etc. Business process engineering can occur in any combination of one or more standard workflow engines. Upon completion of the workflows, the adjudicator associates the workflow ids to the adjudication. The workflows use parameters from the adjudication for their interactions with the rule engine, the time series database, the participants and the assets. The adjudicator also assigns a control transfer function to the adjudication. The control transfer function instructs the self-assembling actuator how often it must check the adjudication, and the general form of the control function (sequential, parallel, negative feedback, etc). The adjudication is now part of the autonomic control system. The self-assembling finite state machine will periodically invoke the sourcing workflows, which will in turn query metrics, invoke decisions, and invoke the necessary actuator workflows. All parameters passed between these systems are acquired by semantically querying the adjudication.

Implementation

Ontologization, adjudication and business rule definition occur in a user-facing application. Embodiments ontologize in an RDF editor, write business rules in Excel and define adjudications in a SPARQL editor. However, further embodiments allocate sections of the codebase and configuration management system to support the development of a user-facing application to ontologize, write business rules and define adjudications.

The terms and descriptions used herein are set forth by way of illustration only and are not meant as limitations. Those skilled in the art will recognize that many variations are possible within the spirit and scope of the invention.

What is claimed is:

1. A system for providing a scalable semantic mechanism for policy-driven assessment and action taking on dynamically changing data, comprising:
   one or more sensors for monitoring and outputting data of managed assets; and
   a plurality of servers accessible via network connection by users of an enterprise, wherein the plurality of servers comprise:
   a policy context persisted in a semantic database located in one or more of the plurality of servers, wherein the policy context includes a polymorphic collection of ontologies that capture governance policies of the enterprise in a semantic, declarative grammar;
   a performance context persisted in a time series database located in one or more of the plurality of servers, wherein the performance context receives and stores data output from the one or more sensors;
   a workflow context implemented using a workflow engine that supports a declarative workflow definition language, wherein the workflow engine is located in one or more of the plurality of servers, and the workflow context determines and directs the workflow process necessary to manage the managed asset;
   a decision context implemented using a business rule engine running on one or more of the plurality of servers, wherein the business rule engine is located in one or more of the plurality of servers, and the decision context contains business rules encoded in a declarative grammar; and an adjudication context persisted in a semantic database located in one or more of the plurality of servers, wherein the adjudication context automatically defines all associations between the policy context, performance context, workflow context and decision context that are necessary to monitor and manage the managed assets, and the adjudication context queries the policy context to determine that correct managed assets are observed, wherein the plurality of servers perform operations by:

receiving the data of the managed assets of the enterprise from the one or more sensors that monitor the managed assets, wherein the managed assets are identified in the policy context;

storing the data received from the one or more sensors in the performance context;

checking the data via the workflow context, and feeding the data to the decision context;

processing the data by applying the business rules of the decision context to the data, and determining whether the data are compliant with required levels or settings, wherein the decision context includes setting thresholds and acceptable levels for the required settings and levels for the managed assets, and wherein each managed asset is mapped to its parameters associated with the data in the adjudication context, and the business rule engine makes decisions of whether actions need to be taken on the parameters mapped with the managed assets whose data are not compliant with the required levels or settings;

deciding which corrective actions are to be applied to the parameters mapped with the managed assets;

effectuating the corrective actions to the parameters mapped with the managed assets to which the corrective actions are to be applied; and receiving updated data of the managed assets from the one or more sensors.

2. The system of claim 1 wherein the data output from the sensors and received by the performance context includes events and metrics, wherein the events represent instantaneous transitions between discrete states of managed assets and metrics represent continuous transitions in the state of managed assets.

3. The system of claim 2 wherein performance context uses declarative and schema-less grammars to define events and metrics and the source managed assets for the received events and metrics.

4. The system of claim 1 wherein performance context time-stamps the data output received from the sensors.

5. The system of claim 1 further comprising a finite state machine that runs on one or more of the plurality of servers and which operates on and executes adjudication context, policy context, performance context, workflow context and decision context.

6. The system of claim 5 wherein the finite state machine is a self-assembling autonomic control system that is a stand-alone application that contain goals, preferences and algorithms to operate the system.

7. The system of claim 6 wherein self-assembling autonomic control system is declarative.

8. The system of claim 1 wherein system executes an observe, orient, decision and action (OODA) loop.

9. The system of claim 8 wherein the OODA loop includes performance context making direct interface invocations to sensors, adjudication context querying policy context, performance context, workflow context and decision context to ensure observations, decisions and actions are compliant with enterprise policies, performance context, workflow context and decision context querying one another to determine whether managed assets are compliant and whether to take corrective action.

10. The system of claim 1 further comprising one or more actuators receiving instructions from the workflow context to make necessary changes to the managed assets, and taking actions to bring the managed assets into compliance with enterprise policies included in policy context.

11. The system of claim 1 wherein the managed assets include servers, networks, firewalls, configuration items, databases, virtual machines, deployed applications and startup scripts.

12. The system of claim 1 wherein the plurality of servers include cloud computing servers that provide a cloud computing environment.

13. The system of claim 12 wherein the cloud computing environment provides the policy context, performance context, workflow context, decision context and adjudication context for the enterprise and a plurality of additional enterprises.

14. The system of claim 13 wherein the policy context, performance context, workflow context, decision context and adjudication context for the enterprise are separated from the policy context, performance contexts, workflow contexts, decision contexts and adjudications contexts for the plurality of additional enterprises using named graphs.

15. The system of claim 1 wherein the operations further comprising:

writing metrics on the time-series database of the performance context, wherein the metrics indicate how much time is spent to correct the managed assets whose data are not compliant with the required levels or settings.

16. A method for providing a scalable semantic mechanism for policy-driven assessment and action taking on dynamically changing data, comprising:

receiving data of managed assets of an enterprise from one or more sensors that monitor the managed assets, wherein the managed assets are identified in a policy context persisted in a semantic database located in one or more of a plurality of servers, and the policy context includes a polymorphic collection of ontologies that capture governance policies of the enterprise in a semantic, declarative grammar;

storing the data received from the one or more sensors in a performance context persisted in a time-series database located in one or more of the plurality of servers;

feeding the data to a decision context that is implemented using a business rule engine located in one or more of the plurality of servers, wherein the decision context contains business rules encoded in a declarative grammar;

processing the data by applying the business rules to the data, and determining whether the data are compliant with required levels or settings, wherein the decision context includes setting thresholds and acceptable levels for the required levels and settings for the managed assets, and wherein each managed asset is mapped to its parameters associated with the data in an adjudication context persisted in a semantic database located in one or more of the plurality of servers, and the business rule engine makes decisions of whether actions need to be taken on the parameters mapped with the managed assets whose data are not compliant with the required levels or settings, wherein the adjudication context queries the policy context to determine that correct managed assets are observed, and the processing the data further comprises supplying the parameters mapped with the managed assets from the adjudication context to the business rule engine to make the decisions of whether actions need to be taken on the parameters mapped with the managed assets;

deciding which corrective actions are to be applied to the parameters mapped with the managed assets;

effectuating the corrective actions to the parameters mapped with the managed assets to which the corrective actions are to be applied, wherein said effectuating the corrective actions includes sending instructions via a workflow context to one or more actuators to make necessary changes to the managed assets, and wherein the workflow context is implemented using a workflow engine that supports a declarative workflow definition language, and the workflow engine is located in one or more of the plurality of servers, wherein the adjudication context automatically defines all associations between the policy context, performance context, workflow context and decision context that are necessary to monitor and manage the managed assets; and receiving updated data of the managed assets from the one or more sensors.

17. The method of claim 16, further comprising:

defining the policy context for the enterprise, wherein the policy context is defined based on user inputs and policy documents of the enterprise received by one or more of the plurality of servers, and wherein said defining the policy context includes creating the ontologies that capture the governance policies of the enterprise in the semantic, declarative grammar;

defining the performance context for the enterprise, wherein said defining the performance context is based on received user inputs, the policy context, an identification of the managed assets of the enterprise and the managed assets that are managed per the policy context, and wherein the performance context is defined in a declarative grammar, and said defining the performance context includes deploying the performance context in the time-series database that is queryable;

defining the workflow context for the enterprise, wherein said defining the workflow context is based on user inputs of the one or more actuators that adjust settings on the managed assets, known information regarding operation of the one or more actuators, and the settings of managed assets, and wherein said defining the workflow context includes serializing the workflow context in a declarative grammar and deploying the workflow context in a queryable workflow engine that is located in one or more of the plurality of servers;

defining the decision context for the enterprise, wherein said defining the decision context for the enterprise includes setting the thresholds and acceptable levels for the managed assets and/or setting business rules for the enterprise, and wherein said defining the decision context includes serializing the decision context in a declarative grammar and deploying the decision context in the business rules engine that is queryable; and defining the adjudication context for the enterprise, wherein said defining the adjudication context maps each managed asset to its parameters associated with the data, and links the policy context, performance context, workflow context and decision context, and wherein said defining the adjudication context includes serializing the adjudication context in a declarative grammar and deploying the adjudication context in the semantic database that is queryable.

18. The method of claim 16, wherein the data of the managed assets include events and metrics of the managed assets, and the events represent instantaneous transitions between discrete states of managed assets and metrics represent continuous transitions in the state of managed assets.

19. The method of claim 16, further comprising:

writing metrics on the time-series database of the performance context, wherein the metrics indicate how much time is spent to correct the managed assets whose data are not compliant with the required levels or settings.

* * * * *